United States Patent
Kang et al.

(10) Patent No.: US 9,819,054 B2
(45) Date of Patent: Nov. 14, 2017

(54) ELECTROLYTE FOR LITHIUM SECONDARY BATTERY AND LITHIUM SECONDARY BATTERY USING THE SAME

(71) Applicant: Samsung Electronics Co., Ltd., Suwon-si, Gyeonggi-do (KR)

(72) Inventors: Yoon-sok Kang, Seongnam-si (KR); Jun-young Mun, Seoul (KR); Min-sik Park, Hwaseong-si (KR); Jae-gu Yoon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 208 days.

(21) Appl. No.: 14/326,556

(22) Filed: Jul. 9, 2014

(65) Prior Publication Data
US 2015/0064578 A1 Mar. 5, 2015

(30) Foreign Application Priority Data
Aug. 30, 2013 (KR) .................. 10-2013-0104501

(51) Int. Cl.
*H01M 10/052* (2010.01)
*H01M 10/0567* (2010.01)
*H01M 4/485* (2010.01)

(52) U.S. Cl.
CPC ..... *H01M 10/0567* (2013.01); *H01M 10/052* (2013.01); *H01M 4/485* (2013.01)

(58) Field of Classification Search
CPC ........... H01M 10/052; H01M 10/0567; H01M 2300/0017
IPC ..................................... H01M 10/052,10/0567
See application file for complete search history.

(56) References Cited

U.S. PATENT DOCUMENTS

| | | | |
|---|---|---|---|
| 5,776,627 A | 7/1998 | Mao et al. | |
| 6,878,491 B1 * | 4/2005 | Miura | C08G 65/14 429/309 |
| 2007/0040145 A1 * | 2/2007 | Muramoto et al. | 252/62.2 |
| 2008/0014496 A1 * | 1/2008 | Watanabe et al. | 429/129 |
| 2008/0076026 A1 | 3/2008 | Ryu et al. | |
| 2010/0173201 A1 * | 7/2010 | Noguchi et al. | 429/223 |
| 2012/0141875 A1 * | 6/2012 | Watanabe | H01M 4/131 429/220 |

FOREIGN PATENT DOCUMENTS

| | | | |
|---|---|---|---|
| CN | 102268119 A | | 12/2011 |
| JP | 09-213348 A | | 8/1997 |
| JP | 2001-167790 A | | 6/2001 |
| JP | 2012-256515 A | | 12/2012 |
| KR | 10-2008-0027503 A | | 3/2008 |
| KR | 1020120055802 A | | 6/2012 |
| KR | 10-2013-0081549 | * | 7/2013 |
| WO | 02/102786 A1 | | 12/2002 |
| WO | 2012/174564 A1 | | 12/2012 |

OTHER PUBLICATIONS

Machine translation of JP 2001-167790, published on Jun. 22, 2001.*
Machine translation of KR-10-2013-0081549, published on Jul. 17, 2013.*
Podobaev, N. I. "New amine-type inhibitors for protection of low-carbon steels in neutral media containing hydrogen sulfide", Zhurnal Prikladnoi Khimii (Sankt-Peterburg, Russian Federation) 1987, 60 (7), 1662-4.

* cited by examiner

Primary Examiner — Anca Eoff
(74) Attorney, Agent, or Firm — Cantor Colburn LLP

(57) ABSTRACT

An electrolyte for a lithium secondary battery, the electrolyte including: a lithium salt; a non-aqueous organic solvent; and a piperazine derivative represented by Formula 1 having an oxidation potential lower than an oxidation potential of the non-aqueous organic solvent by about 2 V to about 4 V:

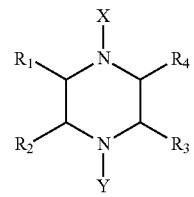

Formula 1 wherein, in Formula 1, X, Y, and $R_1$ to $R_4$ are defined in the specification.

14 Claims, 8 Drawing Sheets

ELECTROLYTE FOR LITHIUM SECONDARY BATTERY AND LITHIUM SECONDARY BATTERY USING THE SAME

CROSS-REFERENCE TO RELATED APPLICATIONS

This application claims the priority to Korean Patent Application No. 10-2013-0104501, filed on Aug. 30, 2013, and all the benefits accruing therefrom under 35 U.S.C. §119, the content of which is incorporated herein in its entirety by reference.

BACKGROUND

1. Field

The present disclosure relates to an electrolyte for a lithium secondary battery, and a lithium secondary battery including the electrolyte.

2. Description of the Related Art

Lithium ions batteries ("LIBs") possess high energy density per unit weight and can be easily designed. Thus, these batteries have been developed for use in small electronic and portable IT devices. In recent years, small and medium sized lithium ion batteries have drawn attention as suitable power sources for electric vehicles and power storage devices storing electricity produced as an alternate.

A lithium secondary battery includes a cathode, an anode, and a separator. During discharging of the lithium secondary battery, oxidation reaction occurs in the anode due to deintercalation of lithium ions, while reduction reaction occurs in the cathode due to intercalation of lithium ions. The vice versa processes take place during the battery charging. The electrolyte has conductivity only for ions, not for electrons, and thus transfers lithium ions between the cathode and the anode.

Lithium ions intercalated into an electrode of a battery lead to charge neutrality with electrons entered into the electrode, and thus serve as media storing electric energy in the electrode. Accordingly, the quantity of electric energy storable by the battery is dependent upon the quantity of lithium ions intercalated into the electrode to create the charge neutrality. Although basic performance of the lithium secondary battery, such as operating voltage and energy density, is dependent upon the materials of the cathode and anode, the electrolyte also needs to have high-ion conductivity, electrochemical stability and thermal stability to ensure high performance of the lithium secondary battery.

A typical lithium ion battery electrolyte consists of a lithium salt and an organic solvent. The electrolyte needs to be electrochemically stable in a voltage range where reduction and oxidation proceed in the anode and cathode, respectively.

As the use of lithium secondary batteries is expanding to electric vehicles and power storage fields, electrode active materials for use at high voltages emerged and became available. Use of a relatively low-potential anode active material and a relatively high-potential cathode active material has led to a narrower potential window of the electrolyte, so that the electrolyte is more likely to decompose on a surface of the cathode/anode. Lithium secondary batteries for electric vehicles and power storage are likely to be exposed to external high-temperature environment conditions, and the temperatures of these lithium secondary batteries may rise during instantaneous charging and discharging. Accordingly, lifetime and stored energy quantity of the lithium secondary battery may be reduced in such high-temperature environment conditions.

Therefore, there remains a demand for the development of an electrolyte composition which would provide improved lifetime and high-rate characteristics of the lithium secondary batteries.

SUMMARY

Provided is an electrolyte for a lithium secondary battery that is resistant to oxidation on a surface of cathode, and that provides improved lifetime characteristics and high-rate characteristics.

Provided is a lithium secondary battery with improved lifetime characteristics and high-rate characteristics, the lithium secondary battery including the electrolyte.

Additional aspects will be set forth in part in the description which follows and, in part, will be apparent from the description, or may be learned by practice of the presented embodiments.

According to an aspect of the present disclosure, an electrolyte for a lithium secondary battery includes:
a lithium salt;
a non-aqueous organic solvent; and
a piperazine derivative represented by Formula 1 having an oxidation potential lower than an oxidation potential of the non-aqueous organic solvent by about 2 V to about 4 V:

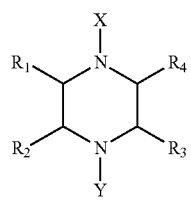

Formula 1 wherein, in Formula 1,
at least one of X and Y is selected from a $C_1$-$C_{60}$ alkyl group, a $C_1$-$C_{60}$ aminoalkyl group, a $C_1$-$C_{60}$ thioalkyl group, a $C_1$-$C_{60}$ hydroxyalkyl group, a $C_1$-$C_{60}$ alkylnitrile group, and a substituted or unsubstituted $C_6$-$C_{60}$ aryl group, and the unselected rest of X and Y is a hydrogen atom;
$R_1$ to $R_4$ are each independently selected from a hydrogen atom, a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, —C(=O)—H, a substituted or unsubstituted $C_1$-$C_{60}$ alkyl group, a substituted or unsubstituted $C_1$-$C_{60}$ alkoxy group, a substituted or unsubstituted $C_1$-$C_{60}$ heteroalkyl group, a substituted or unsubstituted $C_2$-$C_{60}$ alkenyl group, a substituted or unsubstituted $C_2$-$C_{60}$ alkynyl group, a substituted or unsubstituted $C_3$-$C_{10}$ cycloalkyl group, a substituted or unsubstituted $C_3$-$C_{10}$ heterocycloalkyl group, a substituted or unsubstituted $C_2$-$C_{10}$ cycloalkenyl group, a substituted or unsubstituted $C_2$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_2$-$C_{60}$ heteroaryl group, -$(Q_1)_r$-$(Q_2)_s$, —N$(Q_3)(Q_4)(Q_5)$, —P(=O)$(Q_6)(Q_7)$, and —P$(Q_8)(Q_9)(Q_{10})(Q_{11})$;
wherein at least one of $R_{11}$ to $R_{14}$ and at least one of $R_{21}$ to $R_{30}$ are optionally linked to each other to form a substituted or unsubstituted, saturated or unsaturated ring;

$Q_1$ is at least one selected from —O—, —S—, —C(=O)—, a substituted or unsubstituted $C_1$-$C_{60}$ alkylene group, a substituted or unsubstituted $C_2$-$C_{60}$ alkenylene group, a substituted or unsubstituted $C_3$-$C_{10}$ cycloalkylene group, a substituted or unsubstituted $C_3$-$C_{10}$ heterocycloalkylene group, a substituted or unsubstituted $C_2$-$C_{10}$ cycloalkenylene group, a substituted or unsubstituted $C_2$-$C_{10}$ heterocycloalkenylene group, a substituted or unsubstituted $C_6$-$C_{60}$ arylene group, and a substituted or unsubstituted $C_2$-$C_{60}$ heteroarylene group;

$Q_2$ to $Q_{11}$ are each independently selected from a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, a substituted or unsubstituted $C_1$-$C_{60}$ alkyl group, a substituted or unsubstituted $C_1$-$C_{60}$ alkoxy group, a substituted or unsubstituted $C_1$-$C_{60}$ heteroalkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_3$-$C_{10}$ heterocycloalkyl group, a substituted or unsubstituted $C_2$-$C_{10}$ cycloalkenyl group, a substituted or unsubstituted $C_2$-$C_{10}$ heterocycloalkenyl group, a substituted or unsubstituted $C_6$-$C_{60}$ aryl group, a substituted or unsubstituted $C_6$-$C_{60}$ aryloxy group, and a substituted or unsubstituted $C_2$-$C_{60}$ heteroaryl group; and r and s are each independently an integer from 1 to 5, wherein, when r is 2 or greater, groups $Q_1$ are each identical to or different from each other, and when s is 2 or greater, groups $Q_2$ are each identical to or different from each other.

According to another aspect of the present disclosure, a lithium secondary battery includes:
a cathode,
an anode, and
the electrolyte described above disposed between the cathode and the anode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
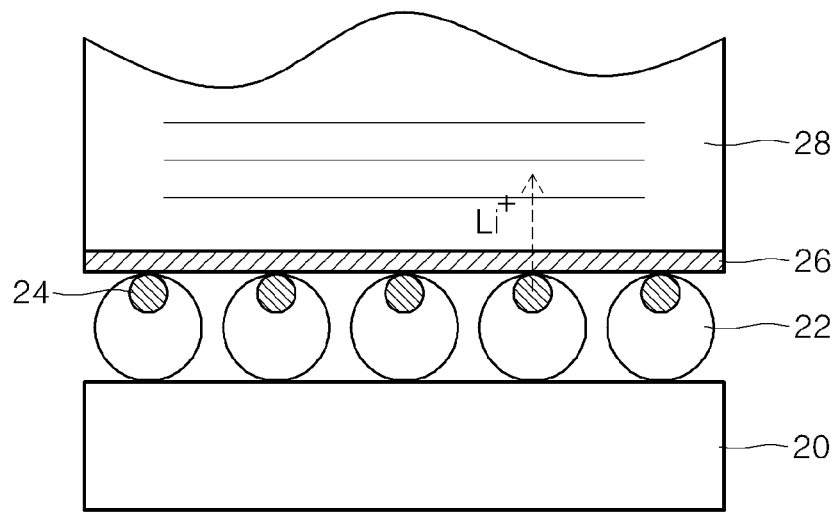
FIG. 1 is a schematic cross-sectional view illustrating a thin film formed on a surface of a cathode of a lithium secondary battery according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "alkyl" indicates a group derived from a completely saturated, branched or unbranched (or a straight or linear) hydrocarbon. Non-limiting examples of the "alkyl" group include methyl, ethyl, n-propyl, isopropyl, n-butyl, isobutyl, sec-butyl, t-butyl, iso-pentyl, neo-pentyl, iso-amyl, n-hexyl, 3-methylhexyl, 2,2-dimethylpentyl, 2,3-dimethylpentyl, and n-heptyl.

As used herein, the term "heteroalkyl" group indicates an alkyl group that comprises at least one heteroatom covalently bonded to one or more carbon atoms of the alkyl group. Each heteroatom is independently chosen from nitrogen (N), oxygen (O), sulfur (S), and phosphorus (P). Non-limiting examples of the "heteroalkyl" group include methoxymethyl and 2-methoxyethyl.

As used herein, the term "cycloalkyl" indicates a group having one or more saturated rings in which all ring members are carbon. Non-limiting examples of the "cycloalkyl" group include cyclopentyl and cyclohexyl.

As used herein, the term "heterocycloalkyl" group indicates an alkyl group that comprises at least one heteroatom covalently bonded to one or more carbon atoms of the cycloalkyl group. Each heteroatom is independently chosen from nitrogen (N), oxygen (O), sulfur (S), and phosphorus (P). Non-limiting examples of the "heterocycloalkyl" group include 2-tetrahydrofuranyl and 2-tetrahydropyranyl.

As used herein, the term "halogen atom" indicates fluorine, bromine, chloride, iodine, and the like.

As used herein, the term "alkoxy" represents "alkyl-O—", wherein the term "alkyl" has the same meaning as described above. Non-limiting examples of the alkoxy group are methoxy, ethoxy, propoxy, 2-propoxy, n-butoxy, sec-butoxy, t-butoxy, pentyloxy, hexyloxy, cyclopropoxy, and cyclohexyloxy.

As used herein, the term "alkenyl" indicates a group derived from a branched or unbranched hydrocarbon with at least one carbon-carbon double bond. Non-limiting examples of the alkenyl group include vinyl, n-propenyl, n-butenyl, iso-propenyl, and iso-butenyl.

As used herein, the term "alkynyl" indicated a group derived from a branched or unbranched hydrocarbon with at least one carbon-carbon triple bond. Non-limiting examples of the "alkynyl" group include ethynyl, n-propynyl, n-butynyl, iso-butynyl, and iso-propynyl.

As used herein, the term "cycloalkenyl" indicates a group derived from a branched or unbranched cyclic hydrocarbon with at least one carbon-carbon double bond inside the cyclic moiety. Non-limiting examples of the cycloalkenyl group include 1-cyclopentenyl and 1-cyclohexenyl.

As used herein, the term "cycloalkynyl" indicates a group derived from a branched or unbranched cyclic hydrocarbon with at least one carbon-carbon triple bond inside the cyclic moiety. Non-limiting examples of the cycloalkynyl group include 1-cyclooctynyl and 1-cyclononynyl.

As used herein, the term "aryl" group, which is used alone or in combination, indicates an aromatic hydrocarbon containing at least one ring. The term "aryl" is construed as including a group with an aromatic ring fused to at least one cycloalkyl ring. Non-limiting examples of the "aryl" group are phenyl, naphthyl, and tetrahydronaphthyl.

As used herein, the term "aryloxy" indicates "—O-aryl". A non-limiting example of the "aryloxy" group is phenoxy.

As used herein, the term "heteroaryl group" indicates a monocyclic or bicyclic organic compound including at least one heteroatom selected from nitrogen (N), oxygen (O), phosphorous (P), and sulfur (S), wherein the rest of the cyclic atoms are all carbon.

The heteroaryl group may include, for example, one to five heteroatoms, and in some embodiments, may include a five- to ten-membered ring. In the heteroaryl group, S or N may be present in various oxidized forms. Non-limiting examples of the monocyclic heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl.

As used herein, the term "heteroaryl" indicates a heteroaromatic ring fused to at least one of an aryl group, a cycloaliphatic group, and a heterocyclic group. Non-limiting examples of the bicyclic heteroaryl group are indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoqinolinyl, thieno[2,3-b]furanyl, furo[3,2-b]-pyranyl, 5H-pyrido[2,3-d]-o-oxazinyl, 1 H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl.

As used herein, the terms "alkylene", "alkenylene", "cycloalkylene", "heterocycloalkylene", "cycloalkenylene", "heterocycloalkenylene", "arylene", and "heteroarylene" indicate divalent groups respectively derived from "alkyl", "alkenyl", "cycloalkyl", "heterocycloalkyl", "cycloalkenyl", "heterocycloalkenyl", "aryl", and "heteroaryl" groups.

According to an embodiment of the present disclosure, an electrolyte for a lithium secondary battery includes:
a lithium salt;
a non-aqueous organic solvent; and
a piperazine derivative having an oxidation potential lower than an oxidation potential of the non-aqueous organic solvent by about 2 V to about 4 V.

The piperazine derivative may include a compound represented by Formula 1 below.

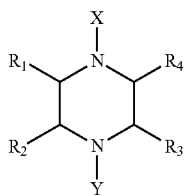

Formula 1

In Formula 1 above, at least one of X and Y may be selected from a $C_1$-$C_{60}$ alkyl group, a $C_1$-$C_{60}$ aminoalkyl group, a $C_1$-$C_{60}$ thioalkyl group, a $C_1$-$C_{60}$ hydroxyalkyl group, a $C_1$-$C_{60}$ alkylnitrile group, and a substituted or unsubstituted $C_6$-$C_{60}$ aryl group, and unselected rest of X and Y is a hydrogen atom;

$R_1$ to $R_4$ may be each independently selected from a hydrogen atom, a deuterium atom, a halogen atom, a hydroxyl group (—OH), a cyano group (—CN), a nitro group (—$NO_2$), an azido group (—$N_3$), an amino group (—NRR', wherein R and R' are independently hydrogen or a $C_1$-$C_{10}$ alkyl group), an amido group (—C(=O)NRR', wherein R and R' are independently hydrogen or a $C_1$-$C_{10}$ alkyl group), an amidino group (—C(=NH)NRR', wherein R and R' are independently hydrogen or a $C_1$-$C_{10}$ alkyl group), a hydrazine group (—NHNRR', wherein R and R' are independently hydrogen or a $C_1$-$C_{10}$ alkyl group), a hydrazone group (—CR=NHNR'R", wherein R, R' and R" are independently hydrogen or a $C_1$-$C_{10}$ alkyl group), a carboxyl group (—$CO_2H$) or a salt thereof, a sulfonic acid group (—$SO_3H$) or a salt thereof, a phosphoric acid group (—P(=O)(OH)$_2$) or a salt thereof, a thiol group (—SH), —C(=O)—H, a substituted or unsubstituted $C_1$-$C_{60}$ alkyl group, a substituted or unsubstituted $C_1$-$C_{60}$ alkoxy group, a substituted or unsubstituted $C_1$-$C_{60}$ heteroalkyl group, a substituted or unsubstituted $C_2$-$C_{60}$ alkenyl group, a substituted or unsubstituted $C_2$-$C_{60}$ alkynyl group, a substituted or unsubstituted $C_3$-$C_{10}$ cycloalkyl group, a substituted or unsubstituted $C_3$-$C_{10}$ heterocycloalkyl group, a substituted or unsubstituted $C_2$-$C_{10}$ cycloalkenyl group, a substituted or unsubstituted $C_2$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_2$-$C_{60}$ heteroaryl group, -($Q_1$)$_r$-($Q_2$)$_s$, —N($Q_3$)($Q_4$)($Q_5$), —P(=O)($Q_6$)($Q_7$), and —P($Q_8$)($Q_9$)($Q_{10}$)($Q_{11}$), wherein $Q_1$ may be selected from —O—, —S—, —C(=O)—, a substituted or unsubstituted $C_1$-$C_{60}$ alkylene group, a substituted or unsubstituted $C_2$-$C_{60}$ alkenylene group, a substituted or unsubstituted $C_3$-$C_{10}$ cycloalkylene group, a substituted or unsubstituted $C_3$-$C_{10}$ heterocycloalkylene group, a substituted or unsubstituted $C_2$-$C_{10}$ cycloalkenylene group, a substituted or unsubstituted $C_2$-$C_{10}$ heterocycloalkenylene group, a substituted or unsubstituted $C_6$-$C_{60}$ arylene group, and a substituted or unsubstituted $C_2$-$C_{60}$ heteroarylene group;

$Q_2$ to $Q_{11}$ may be each independently selected from a deuterium atom, a halogen atom, a hydroxyl group (—OH), a cyano group (—CN), a nitro group (—$NO_2$), an azido group (—$N_3$), an amino group (—NRR', wherein R and R' are independently hydrogen or a $C_1$-$C_{10}$ alkyl group), an amido group (—C(=O)NRR', wherein R and R' are independently hydrogen or a $C_1$-$C_{10}$ alkyl group), an amidino group (—C(=NH)NRR', wherein R and R' are independently hydrogen or a $C_1$-$C_{10}$ alkyl group), a hydrazine group (—NHNRR', wherein R and R' are independently hydrogen or a $C_1$-$C_{10}$ alkyl group), a hydrazone group (—CR=NHNR'R", wherein R, R' and R" are independently hydrogen or a $C_1$-$C_{10}$ alkyl group), a carboxyl group (—$CO_2H$) or a salt thereof, a sulfonic acid group (—$SO_3H$) or a salt thereof, a phosphoric acid group (—P(=O)(OH)$_2$) or a salt thereof, a thiol group (—SH), a substituted or unsubstituted $C_1$-$C_{60}$ alkyl group, a substituted or unsubstituted $C_1$-$C_{60}$ alkoxy group, a substituted or unsubstituted $C_1$-$C_{60}$ heteroalkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_3$-$C_{10}$ heterocycloalkyl group, a substituted or unsubstituted $C_2$-$C_{10}$ cycloalkenyl group, a substituted or unsubstituted $C_2$-$C_{10}$ heterocycloalkenyl group, a substituted or unsubstituted $C_6$-$C_{60}$ aryl group, a substituted or unsubstituted $C_6$-$C_{60}$ aryloxy group, and a substituted or unsubstituted $C_2$-$C_{60}$ heteroaryl group; and r and s may be each independently an integer from 1 to 5.

When r is 2 or greater, group $Q_1$ may each be identical to or different from each other. When s is 2 or greater, group $Q_2$ may each be identical to or different from each other.

In some embodiments, in Formula 1, $R_1$ to $R_4$ may be each independently selected from a hydrogen atom, a deuterium atom, a halogen atom, a hydroxyl group (—OH), a cyano group (—CN), a nitro group (—$NO_2$), an azido group (—$N_3$), an amino group (—NRR', wherein R and R' are independently hydrogen or a $C_1$-$C_{10}$ alkyl group), an amido group (—C(=O)NRR', wherein R and R' are independently hydrogen or a $C_1$-$C_{10}$ alkyl group), an amidino group (—C(=NH)NRR', wherein R and R' are independently hydrogen or a $C_1$-$C_{10}$ alkyl group), a hydrazine group (—NHNRR', wherein R and R' are independently hydrogen or a $C_1$-$C_{10}$ alkyl group), a hydrazone group (—CR=NHNR'R", wherein R, R' and R" are independently hydrogen or a $C_1$-$C_{10}$ alkyl group), a carboxyl group (—$CO_2H$) or a salt thereof, a sulfonic acid group (—$SO_3H$) or a salt thereof, a phosphoric acid group (—P(=O)(OH)$_2$) or a salt thereof, a thiol group (—SH), —C(=O)—H, a methyl group, an ethyl group, an n-propyl group, an isopropyl group, an n-butyl group, an isobutyl group, a sec- butyl group, a tert-butyl group, an n-pentyl group, an isopentyl group, a sec-pentyl group, a tert-pentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and -($Q_1$)$_r$-($Q_2$)$_s$, wherein $Q_1$ may be selected from —O—, —S—, —C(=O)—, a $C_1$-$C_{10}$ alkylene group, a $C_6$-$C_{14}$ arylene group, and a $C_2$-$C_{14}$ heteroarylene group;

$Q_2$ may be selected from a deuterium atom, a halogen atom, a hydroxyl group (—OH), a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group (—SH), —C(=O)—H, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and a $C_1$-$C_{10}$ alkoxy group, and r and s may each independently be an integer from 1 to 5 wherein, when r is 2 or greater, groups $Q_1$ are each identical to or different from each other, and when s is 2 or greater, groups $Q_2$ are each identical to or different from each other, but are not limited thereto.

In some other embodiments, in Formula 1, $R_1$ to $R_4$ may be each independently selected from a hydrogen atom, a deuterium atom, a halogen atom, a hydroxyl group (—OH), a cyano group (—CN), a nitro group (—NO$_2$), an azido group (—N$_3$), an amino group (—NRR', wherein R and R' are independently hydrogen or a $C_1$-$C_{10}$ alkyl group), an amido group (—C(=O)NRR', wherein R and R' are independently hydrogen or a $C_1$-$C_{10}$ alkyl group), an amidino group (—C(=NH)NRR', wherein R and R' are independently hydrogen or a $C_1$-$C_{10}$ alkyl group), a hydrazine group (—NHNRR', wherein R and R' are independently hydrogen or a $C_1$-$C_{10}$ alkyl group), a hydrazone group (—CR=NHNR'R", wherein R, R' and R" are independently hydrogen or a $C_1$-$C_{10}$ alkyl group), a carboxyl group (—CO$_2$H) or a salt thereof, a sulfonic acid group (—SO$_3$H) or a salt thereof, a phosphoric acid group (—P(=O)(OH)$_2$) or a salt thereof, a thio group (—SH), —C(=O)—H, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, a n-decyl group, an isodecyl group, a sec-decyl group, a tert-decyl group, and the groups represented by Formulae 3A and 3B, but are not limited thereto:

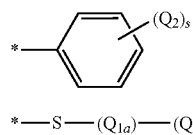

Formula 3A

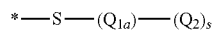

Formula 3B

In Formulae 3A and 3B, $Q_{1a}$ may be a $C_1$-$C_{10}$ alkylene group;

$Q_2$ may be selected from a deuterium atom, a halogen atom, a hydroxyl group (—OH), a cyano group (—CN), a nitro group (—NO$_2$), an azido group (—N$_3$), an amino group (—NRR', wherein R and R' are independently hydrogen or a $C_1$-$C_{10}$ alkyl group), an amido group (—C(=O)NRR', wherein R and R' are independently hydrogen or a $C_1$-$C_{10}$ alkyl group), an amidino group (—C(=NH)NRR', wherein R and R' are independently hydrogen or a $C_1$-$C_{10}$ alkyl group), a hydrazine group (—NHNRR', wherein R and R' are independently hydrogen or a $C_1$-$C_{10}$ alkyl group), a hydrazone group (—CR=NHNR'R", wherein R, R' and R" are independently hydrogen or a $C_1$-$C_{10}$ alkyl group), a carboxyl group (—CO$_2$H) or a salt thereof, a sulfonic acid group (—SO$_3$H) or a salt thereof, a phosphoric acid group (—P(=O)(OH)$_2$) or a salt thereof, a thiol group (—SH), —C(=O)—H, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and a $C_1$-$C_{10}$ alkoxy group; and s may be an integer of 1, 2, or 3.

In some embodiments, the piperazine derivative may be a compound represented by Formula 2 below.

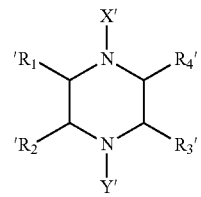

Formula 2

In Formula 2, at least one of X' and Y' may be selected from a $C_1$-$C_{10}$ hydroxyalkyl group, a $C_1$-$C_{10}$ oaminoalkyl group, a $C_1$-$C_{10}$ alkylnitrile group, and a substituted or unsubstituted $C_1$-$C_{10}$ aryl group, and the unselected rest of X' and Y' is a hydrogen atom; and $R_1$ to $R_4$ may be each independently selected from a hydrogen atom, a deuterium atom, a halogen atom, a hydroxyl group (—OH), a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group (—SH), —C(=O)—H, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and -(Q$_1$)$_r$-(Q$_2$)$_s$, wherein $Q_1$ may be selected from —O—, —S—, —C(=O)—, a $C_1$-$C_{10}$ alkylene group, a $C_6$-$C_{14}$ arylene group, and a $C_2$-$C_{14}$ heteroarylene group;

$Q_2$ may be selected from a deuterium atom, a halogen atom, a hydroxyl group, a cyano group (—CN), a nitro group (—NO$_2$), an azido group (—N$_3$), an amino group (—NRR', wherein R and R' are independently hydrogen or a $C_1$-$C_{10}$ alkyl group), an amido group (—C(=O)NRR', wherein R and R' are independently hydrogen or a $C_1$-$C_{10}$ alkyl group), an amidino group (—C(=NH)NRR', wherein R and R' are independently hydrogen or a $C_1$-$C_{10}$ alkyl group), a hydrazine group (—NHNRR', wherein R and R' are independently hydrogen or a $C_1$-$C_{10}$ alkyl group), a hydrazone group (—CR=NHNR'R", wherein R, R' and R" are independently hydrogen or a $C_1$-$C_{10}$ alkyl group), a carboxyl group (—$CO_2H$) or a salt thereof, a sulfonic acid group (—$SO_3H$) or a salt thereof, a phosphoric acid group (—P(=O)(OH)$_2$) or a salt thereof, a thiol group, —C(=O)—H, a methyl group, an ethyl group, an n-propyl group, an isopropyl group, an n-butyl group, an isobutyl group, a sec-a butyl group, a tert-butyl group, a n-pentyl group, an isopentyl group, a sec-pentyl group, a tert-pentyl group, a n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and a $C_1$-$C_{10}$ alkoxy group, and r and s may each independently be an integer from 1 to 5 wherein, when r is 2 or greater, groups $Q_1$ are each identical to or different from each other, and when s is 2 or greater, groups $Q_2$ are each identical to or different from each other, but are not limited thereto.

In some embodiments, the piperazine derivative of Formula 1 may include at least one of compounds represented by Formulae 3 to 6 below, but is not limited thereto.

Formula 3

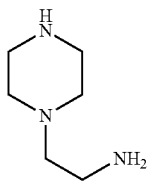

Formula 4

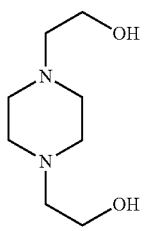

Formula 5

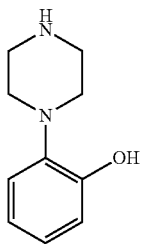

Formula 6

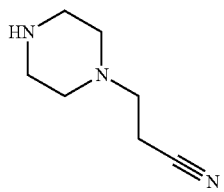

As used herein, with regard to the term "a substituted or unsubstituted", "substituted" means substitution with a halogen atom, a $C_1$-$C_{10}$ alkyl group substituted with a halogen atom (for example, $CF_3$, $CHF_2$, $CH_2F$, $CCl_3$, or the like), a $C_1$-$C_{10}$ alkoxy group, a hydroxyl group (—OH), a nitro group (—$NO_2$), an azido group (—$N_3$), a cyano group (—CN), an amino group (—NRR', wherein R and R' are independently hydrogen or a $C_1$-$C_{10}$ alkyl group), an amido group (—C(=O)NRR', wherein R and R' are independently hydrogen or a $C_1$-$C_{10}$ alkyl group), an amidino group (—C(=NH)NRR', wherein R and R' are independently hydrogen or a $C_1$-$C_{10}$ alkyl group), a hydrazine group (—NHNRR', wherein R and R' are independently hydrogen or a $C_1$-$C_{10}$ alkyl group), a hydrazone group (—CR=NHNR'R", wherein R, R' and R" are independently hydrogen or a $C_1$-$C_{10}$ alkyl group), a carboxyl group (—$CO_2H$) or a salt thereof, a sulfonyl group, a sulfamoyl group, a sulfonic acid group (—$SO_3H$) or a salt thereof, a phosphoric acid (—P(=O)(OH)$_2$) or a salt thereof, or a $C_1$-$C_{10}$ alkyl group, a $C_2$-$C_{10}$ alkenyl group, a $C_2$-$C_{10}$ alkynyl group, or a $C_1$-$C_{10}$ heteroalkyl group.

An amount of the piperazine derivative may be from about 0.005 percent by weight ("wt %") or greater to less than about 10 wt % based on a total weight of the electrolyte. For example, the amount of the piperazine derivative may be from about 0.01 wt % to about 7 wt %, in some embodiments, from about 0.05 wt % to about 5 wt %, and in some other embodiments, from about 0.01 wt % to about 1 wt %, based on the total weight of the electrolyte. When the amount of the piperazine derivative is within these ranges, the piperazine derivative may be dissolved in the electrolyte while suppressing a side reaction of the electrolyte, thus forming a thin film on a cathode surface to facilitate conducting of lithium ions between the cathode and the electrolyte.

The electrolyte of a lithium secondary battery serves as a path for lithium ions. Accordingly, if the electrolyte is oxidized or reduced through reaction with an electrode active material during charging and discharging the battery, migration of lithium ions through the electrolyte may be impaired, thus deteriorating charging and discharging performances of the lithium secondary battery.

An oxidation potential of the piperazine derivative may be lower than an oxidation potential of a non-aqueous organic solvent of the electrolyte, for example, by about 2 Volts ("V") to about 4 V. Accordingly, when a lithium secondary battery using an electrolyte including the piperazine derivative is operated, the piperazine derivative may be oxidized and/or decomposed at a higher rate than that of the non-aqueous organic solvent, thus resulting in a stable thin film on a surface of an electrode, for example, a cathode. Although the film formation mechanism has not been found yet, ring opening or polymerization of the additive via oxidation may form a thin film. The thin film formed on the surface of the cathode blocks a cathode active material from directly contacting the electrolyte, thereby preventing the electrolyte from oxidizing on the surface of the cathode, and the charging and discharging performance from deteriorating. The thin film on the surface of the cathode may serve as a migration path for lithium ions, and thus, a lithium secondary battery including the thin film may have improved lifetime characteristics and improved high-rate characteristics.

The non-aqueous organic solvent, which is in the electrolyte of a lithium secondary battery according to the above-described embodiments, may serve as a migration medium of ions involved in electrochemical reactions of the battery. Any suitable non-aqueous organic solvent that is commonly used in the art may be used. For example, the non-aqueous organic solvent may be a carbonate compound, an ester compound, an ether compound, a ketone compound, an alcohol compound, an aprotic bipolar solvent, or a combination thereof.

The carbonate compound may be an open chain carbonate compound, a cyclic carbonate compound, a fluoro carbonate derivative thereof, or a combination thereof.

Non-limiting examples of the chain carbonate compound are diethyl carbonate ("DEC"), dimethyl carbonate, ("DMC"), dipropyl carbonate ("DPC"), methylpropyl carbonate ("MPC"), ethylpropylcarbonate ("EPC"), methylethyl carbonate ("MEC"), and a combination thereof. Non-limiting examples of the cyclic carbonate compound are ethylene carbonate ("EC"), propylenecarbonate ("PC"), butylene carbonate ("BC"), fluoroethylene carbonate ("FEC"), vinylethylene carbonate ("VEC"), and a combination thereof.

Non-limiting examples of the fluorocarbonate compound are fluoroethylene carbonate ("FEC"), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methylethylene carbonate, 4,4,5-trifluoro-5-methylethylene carbonate, trifluoromethylethylene carbonate, and a combination thereof.

The carbonate compound may include a combination of cyclic carbonate and chain carbonate, in consideration of dielectric constant and viscosity of the electrolyte. For example, when an amount of a cyclic carbonate compound is at least 10% by volume based on a total volume of the non-aqueous organic solvent, cycle characteristics of a lithium secondary battery may be markedly improved.

The carbonate compound may be a mixture of such chain carbonate and/or cyclic carbonate compounds as described above with a fluorocarbonate compound. The fluorocarbonate compound may increase solubility of a lithium salt to improve ionic conductivity of the electrolyte, and may facilitate formation of the thin film on the anode. In some embodiments, the fluorocarbonate compound may be fluoroethylene carbonate ("FEC"). An amount of the fluorocarbonate compound may be from about 1 to about 30 percent by volume ("volume %") based on a total volume of the non-aqueous organic solvent. When the amount of the fluorocarbonate compound is within this range, the electrolyte may have an appropriate viscosity to provide desired effects thereof.

Non-limiting examples of the ester compound are methyl acetate, ethyl acetate, n-propyl acetate, dimethyl acetate, methyl propionate ("MP"), ethyl propionate, γ-butyrolactone, decanolide, valerolactone, mevalonolactone, caprolactone, and methyl formate. Non-limiting examples of the ether compound are dibutyl ether, tetraglyme, diglyme, 1,2-dimethoxyethane, 1,2-diethoxyethane, ethoxymethoxyethane, 2-methyltetrahydrofuran, and tetrahydrofuran. An example of the ketone compound is cyclohexanone. Non-limiting examples of the alcohol compound are ethyl alcohol and isopropyl alcohol.

Examples of the aprotic solvent are nitriles (such as R—CN, wherein R is a C2-C20 linear, branched, or cyclic hydrocarbon-based moiety that may include a double-bond, an aromatic ring or an ether bond), amides (such as formamide and dimethylformamide), dioxolanes (such as 1,2-dioxolane and 1,3-dioxolane), methylsulfoxide, sulfolanes (such as sulfolane and methylsulfolane), 1,3-dimethyl-2-imidazolidinone, N-methyl-2-pyrrolidinone, nitromethane, trimethyl phosphate, triethyl phosphate, trioctyl phosphate, and triester phosphate.

The non-aqueous organic solvent may be used alone or in a combination of at least two solvents. In the latter case, a mixing ratio of the at least two non-aqueous organic solvents may be appropriately adjusted depending on a desired performance of the battery.

The non-aqueous organic solvent may further include an aromatic hydrocarbon organic solvent in the carbonate solvent. The carbonate solvent and the aromatic hydrocarbon organic solvent may be mixed, for example, in a volume ratio of about 1:1 to about 30:1.

An example of the aromatic hydrocarbon organic solvent is an aromatic hydrocarbon-based compound represented by formula below:

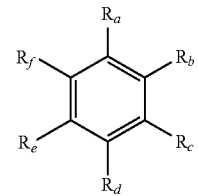

In the formula above, $R_a$ to $R_f$ may be each independently a hydrogen atom, a halogen atom, a $C_1$-$C_{10}$ alkyl group, a haloalkyl group, or a combination thereof.

Examples of the aromatic hydrocarbon organic solvent are benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, 2-fluorotoluene, 3-fluorotoluene, 4-fluorotoluene, 2,3-difluorotoluene, 2,4-difluorotoluene, 2,5-difluorotoluene, 2,6-difluorotoluene, 3,4-difluorotoluene, 3,5-difluorotoluene, 2,3,4-trifluorotoluene, 2,3,5-trifluorotoluene, 2,3,6-trifluorotoluene, 3,4,5-trifluorotoluene, 2,4,5-trifluorotoluene, 2,4,6-trifluorotoluene, 2-chlorotoluene, 3-chlorotoluene, 4-chlorotoluene, 2,3-dichlorotoluene, 2,4-dichlorotoluene, 2,5-dichlorotoluene, 2,6-dichlorotoluene, 2,3,4-trichlorotoluene, 2,3,5-trichlorotoluene, 2,3,6-trichlorotoluene, 3,4,5-trichlorotoluene, 2,4,5-trichlorotoluene, 2,4,6-trichlorotoluene, 2-iodotoluene, 3-iodotoluene, 4-iodotoluene, 2,3-diiodotoluene, 2,4-diiodotoluene, 2,5-diiodotoluene, 2,6-diiodotoluene, 3,4-diiodotoluene, 3,5-diiodotoluene, 2,3,4-triiodotoluene, 2,3,5-triiodotoluene, 2,3,6-triiodotoluene, 3,4,5-triiodotoluene, 2,4,5-triiodotoluene, 2,4,6-triiodotoluene, o-xylene, m-xylene, p-xylene, and combinations thereof.

The lithium salt, which is in the electrolyte of a lithium secondary battery according to the above embodiment, may be soluble in the organic solvent, and serves as a lithium ion source in the lithium secondary battery to enable routine operation of the lithium secondary battery. The lithium salt may be any suitable lithium salt that is commonly used for lithium batteries. Examples of the lithium salt for the non-aqueous electrolyte are $LiPF_6$, $LiBF_4$, $LiSbF_6$, $LiAsF_6$, $LiSbF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiAlF_4$, $LiBPh_4$, $LiB_{10}Cl_{10}$, $CH_3SO_3Li$, $C_4F_3SO_3Li$, $(CF_3SO_2)_2NLi$, $LiN(C_xF_{2x+1}SO_2)(C_xF_{2y+1}SO_2)$ (wherein x and y are natural numbers), $CF_3CO_2Li$, $LiCl$, $LiBr$, $LiI$, LiBOB (lithium bisoxalato borate), lower aliphatic carboxylic acid lithium, lithium terphenylborate, lithium imide, and a combination thereof. These lithium salts may be used as a supporting electrolytic salt.

A concentration of the lithium salt may be within a range known to one of ordinary skill in the art. The concentration of the lithium salt is not specifically limited, and in some embodiments, may be in a range of about 0.1 molar ("M") to about 2.0 M in the electrolyte to improve practical performance of a lithium battery. When the concentration of the lithium salt is within this range, the electrolyte may have appropriate conductivity and appropriate viscosity for improved performance, and may improve mobility of lithium ions.

In some embodiments, the electrolyte for a lithium battery may further include an additive to facilitate the formation of a stable solid electrolyte interphase ("SEI") or a thin film on a surface of an electrode to provide improved cycle characteristics.

Non-limiting examples of the additive are tris(trimethylsilyl)phosphate ("TMSPa"), lithium difluoro oxalate borate ("LiFOB"), vinylene carbonate ("VC"), propane sulfone ("PS"), succinonitrile ("SN"), $LiBF_4$, a silane compound having a functional group able to form a siloxane bond (for example, acryl, amino, epoxy, methoxy, ethoxy, or vinyl), and a silazane compound such as hexamethyldisilazane. These additives may be used alone or in a combination of at least two thereof.

An amount of the additive may be from about 0.01 wt % to about 10 wt % based on a total weight of the non-aqueous organic solvent. For example, the amount of the additive may be from 0.05 wt % to about 10 wt %, in some embodiments, from about 0.1 wt % to about 5 wt %, and in some other embodiments, from about 0.5 wt % to about 4 wt %, based on the total weight of the non-aqueous organic solvent. However, the amount of the additive is not particularly limited unless the additive significantly hinders improvement in capacity retention rate of a lithium battery including the electrolyte.

Hereinafter, embodiments of a lithium secondary battery including any of the electrolytes according to the above-described embodiments will be described in detail.

According to an embodiment of the present disclosure, a lithium battery includes a cathode,
an anode and
an electrolyte disposed between the cathode and the anode.

The lithium battery may be manufactured using a method known in the art. As described in the above embodiments, the electrolyte of the lithium battery may include a lithium salt, a non-aqueous organic solvent, and a piperazine derivative having an oxidation potential lower than an oxidation potential of the non-aqueous organic solvent by about 2 V to about 4 V, wherein the piperazine derivative may include a compound represented by Formula 1 above. The piperazine derivative of Formula 1 above, the non-aqueous organic solvent, and the lithium salt are the same as those described in the previous embodiments.

A thin film may be disposed between the cathode and the electrolyte. The thin film is not a film formed via an additional process, such as coating. The thin film may be a film derived from at least a part of the additive in the electrolyte. The piperazine derivative of Formula 1 above has both nitrogen moiety having an electron-donating non-covalent electron pair and a polar functional group, and thus may be oxidized before the oxidation of the electrolyte for forming a thin film on a cathode surface.

In the electrolyte of the lithium secondary battery, since the piperazine derivative of Formula 1 above forms the thin film on the surface of the cathode, the amount of the piperazine compound may be reduced after operation of the lithium secondary battery.

For example, the amount of the piperazine compound in the electrolyte after operation of the lithium secondary battery may be smaller than that before the operation of the lithium secondary battery.

According to the above-embodiments of the present disclosure, the lithium secondary battery may have a thin film formed on the surface of the cathode due to oxidation of at least a part of the additive in the electrolyte during initial charging of the lithium secondary battery. Thus, the lithium secondary battery may have improved capacity retention characteristics, lifetime characteristics and high-rate characteristics even when charged at a high operating voltage of about 4.0 V to about 5.5 V, for example, a voltage about 4.3 V to about 5.5 V.

When using the electrolyte including the piperazine derivative, the lithium secondary battery may further include a thin film on a surface of the cathode, the thin film having a thickness of, for example, about 0.05 nanometers ("nm") to about 100 nm. For example, the thin film may have a thickness of about 0.1 nm to about 80 nm, and in some embodiments, about 0.5 nm to about 50 nm. The thin film on the cathode surface may effectively prevent oxidation of the electrolyte on the cathode surface so that the conduction of lithium ions is not impeded.

FIG. 1 is a schematic cross-sectional view illustrating a thin film formed on a surface of a cathode of a lithium secondary battery, according to an exemplary embodiment. Referring to FIG. 1, a durable thin film 26 is formed on surfaces of cathode active material 22 applied on a cathode current collector 20. As illustrated in FIG. 1, lithium ions 24 may effectively migrate from the cathode to the electrolyte 28.

Figure 2:
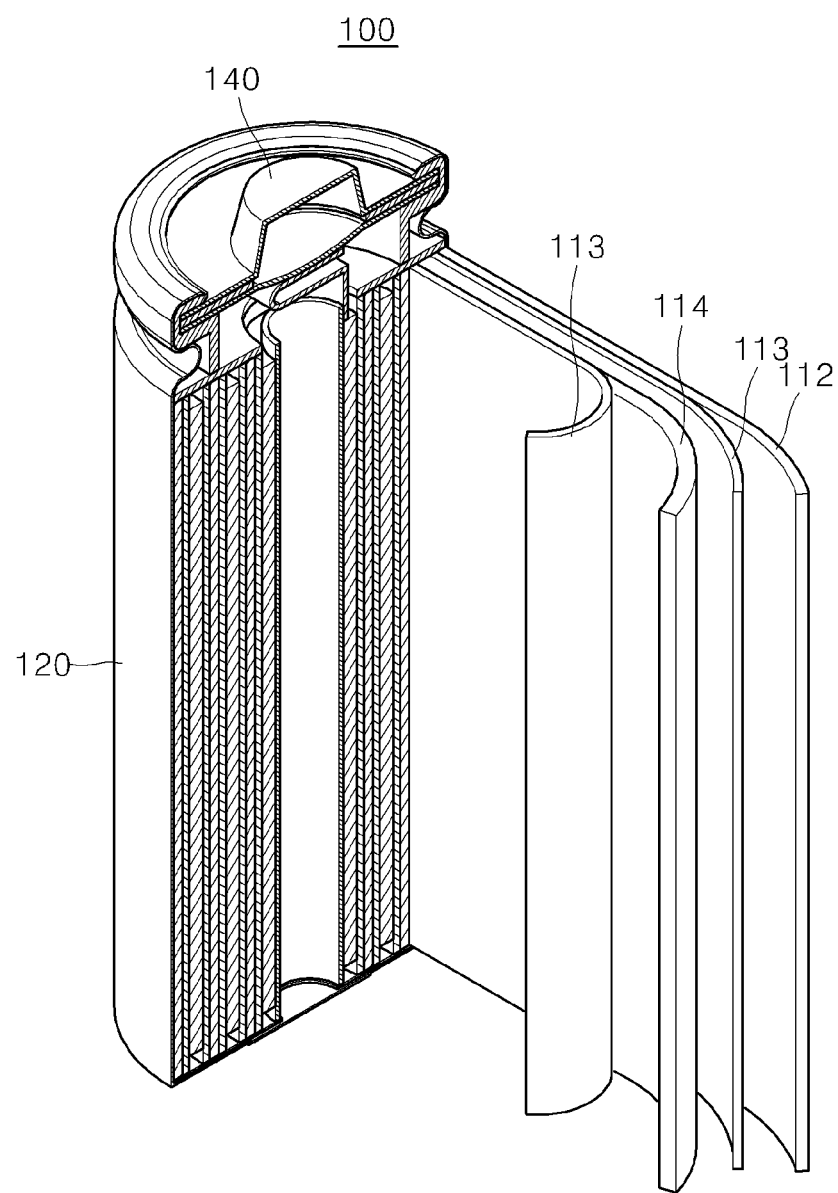
FIG. 2 is an exploded perspective view of a lithium secondary battery according to an embodiment.

FIG. 2 is an exploded perspective view of a lithium secondary battery 100 according to an embodiment. Although the lithium secondary battery 100 illustrated in FIG. 2 is cylindrical, embodiments of the present disclosure are not limited thereto, and lithium secondary batteries according to embodiments may be of a rectangular type or a pouch type.

Lithium secondary batteries may be classified as lithium ion batteries, lithium ion polymer batteries, or lithium polymer batteries, according to the type of separator and/or electrolyte included therein. In addition, lithium batteries may be classified as cylindrical type, rectangular type, coin type, or pouch type, according to the shape thereof. Lithium batteries may also be classified as either bulk type or thin film type, according to the size thereof. Lithium secondary batteries according to embodiments may have any appropriate shape. The structure of a lithium secondary battery and a method of manufacturing the same are known in the art, so a detailed description thereof will not be recited here.

Referring to FIG. 2, the lithium secondary battery 100, which is cylindrical, includes an anode 112, a cathode 114, a separator 113 disposed between the anode 112 and the cathode 114, and an electrolyte (not shown) impregnated into the anode 112, the cathode 114 and the separator 113, a battery case 120, and a sealing member 140 sealing the battery case 120. The lithium secondary battery 100 is manufactured by sequentially stacking the anode 112, the cathode 114, and the separator 113 upon one another to form a stack, rolling the stack in a spiral form, and accommodating the rolled up stack in the battery case 120.

The cathode 114 includes a cathode current collector, and a cathode active material layer disposed on the cathode current collector.

The cathode current collector may have a thickness of about 3 micrometers ("μm") to about 500 μm. The cathode current collector is not particularly limited, and may be formed of any material so long as it has a suitable conductivity without causing chemical changes in the fabricated battery. Examples of the cathode current collector include copper, stainless steel, aluminum, nickel, titanium, sintered carbon, copper or stainless steel that is surface-treated with carbon, nickel, titanium or silver, and aluminum-cadmium alloys. In addition, the cathode current collector may be processed to have fine irregularities on surfaces thereof so as to enhance adhesive strength of the cathode current collector to the cathode active material, and may be used in any of various forms including films, sheets, foils, nets, porous structures, foams, and non-woven fabrics.

The cathode active material layer includes a cathode active material, a binder, and optionally a conducting agent.

Any lithium-containing metal oxide that is commonly used in the art may be used as the cathode active material. The common cathode active material may be at least one of a composite oxide of lithium with a metal selected from Co, Mn, Ni, and a combination thereof. For example, the common cathode active material may be at least one of compounds represented by the following formula: $Li_aA_{1-b}B_bD_2$ (wherein $0.90 \leq a \leq 1$, and $0 \leq b \leq 0.5$); $Li_aE_{1-b}B_bI_{2-c}D_c$ (wherein $0.90 \leq a \leq 1$, $0 \leq b \leq 0.5$, and $0 \leq c \leq 0.05$); $LiE_{2-b}B_bO_{4-c}D_c$ (wherein $0 \leq b \leq 0.5$, and $0 \leq c \leq 0.05$); $Li_aNi_{1-b-c}Co_bB_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1$, $0b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0.001 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); $LiFePO_4$.

In the formulae above, A is selected from nickel (Ni), cobalt (Co), manganese (Mn), and combinations thereof; B is selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from oxygen (O), fluorine (F), sulfur (S), phosphorus (P), and combinations thereof; E is selected from cobalt (Co), manganese (Mn), and combinations thereof; F is selected from fluorine (F), sulfur (S), phosphorus (P), and combinations thereof; G is selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I is selected from chromium (Cr), vanadium (V), iron (Fe), scandium (Sc), yttrium (Y), and combinations thereof; and J is selected from vanadium (V), chromium (Cr), manganese (Mn), cobalt (Co), nickel (Ni), copper (Cu), and combinations thereof.

In some embodiments, the cathode active material may be $LiCoO_2$, $LiMn_xO_{2x}$ (wherein $x=1$ or 2), $LiNi_{1-x}Mn_xO_{2x}$ (wherein $0<x<1$), $LiNi_{1-x-y}Co_xMn_yO_2$ (wherein $0 \leq x \leq 0.5$ and $0 \leq y \leq 0.5$), or $FePO_4$.

In some other embodiments, the cathode active material may include at least one of $LiCoO_2$, $LiNi_{1-x}Co_xO_2$ (wherein $0 \leq x < 1$), $Li_{1-x}M_xO_2$ (wherein M is at least one of Mn and Fe, and $0.03 < x < 0.1$), $Li[Ni_xCo_{1-2x}Mn_x]O_2$ (wherein $0<x<0.5$), $Li[Ni_xMn_x]O_2$ (wherein $0<x \leq 0.5$), $Li_{1+x}(Ni,Co,Mn)_{1-y}O_z$ (wherein $0<x \leq 1$, $0 \leq y < 1$, and $2 \leq z \leq 4$), $LiM_2O_4$ (wherein M is at least one of Ti, V, and Mn), $LiM_xMn_{2-x}O_4$ (wherein M is a transition metal), $LiFePO_4$, $LiMPO_4$ (wherein M is at least one of Mn, Co, and Ni), $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta Mn_yV_2O_5$, $\delta$-$NH_4V_4O_{10}$, $Mn_{0.8}V_7O_{16}$, $LiV_3O_8$, $Cu_xV_2O_5$, $Cr_xV_6O_{13}$, $M_2(XO_4)_3$ (wherein M is a transition metal, and X is at least one of S, P, As, Mo, and W), and $Li_3M_2(PO_4)_3$ (wherein M is at least one of Fe, V, and Ti).

For example, the cathode active material may include $Li_{1+x}M_{1-x}O_2$ (wherein M is at least one of Ni, Co, and Mn, and $0.05 \leq x \leq 0.2$) or $LiNi_{0.5}Mn_{1.5}O_4$. These cathode active materials may be used in implementing high-voltage lithium secondary batteries.

The compounds listed above as cathode active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or any other method known to one of ordinary skill in the art. Thus, a detailed description thereof will be omitted herein.

The binder strongly binds positive cathode active material particles together and to a current collector. Examples of the binder are, but not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, and nylon.

The conducting agent is used to provide conductivity to electrodes. Any electron conducting material that does not induce chemical change in batteries may be used. Examples of the conducting agent include natural graphite, artificial graphite, carbon black, acetylene black, ketjen black, carbon fibers, and metallic materials, including copper, nickel, aluminum, and silver, in powder or fiber form. The conducting agent may include a single conductive material, such as a polyphenylene derivative, or a combination of at least two conductive materials.

The amounts of the cathode active material, the binder, and the conducting agent may be equivalent to those commonly used in lithium batteries. For example, a weight ratio of the cathode active material to a mixture of the conducting agent and the binder may be from about 98:2 to about 92:8, and in some embodiments from about 95:5 to about 90:10. A mixing ratio of the conducting agent to the binder may be, but not limited, from about 1:1.5 to about 1:3.

The cathode active material may have, for example, an operating voltage range of about 4.0 V to about 5.5 V.

The anode 112 includes an anode current collector and a cathode active material layer disposed on the anode current collector.

The anode current collector may have, for example, a thickness of about 3 μm to about 500 μm. The anode current collector is not particularly limited, and may be formed of any material so long as it has a suitable conductivity without causing chemical changes in the fabricated battery. Examples of the anode current collector are copper, stainless steel, aluminum, nickel, titanium, sintered carbon, copper or stainless steel that is surface-treated with carbon, nickel, titanium or silver, and aluminum-cadmium alloys. In addition, the anode current collector may be processed to have fine irregularities on surfaces thereof so as to enhance adhesive strength of the anode current collector to the anode active material, and may be used in any of various forms including films, sheets, foils, nets, porous structures, foams, and non-woven fabrics.

The anode active layer includes an anode active material, a binder, and optionally a conducting agent.

The anode active material is not particularly limited, and may be selected from any anode active materials used in the art. Non-limiting examples of the anode active material are lithium metal, a lithium metal alloy, a transition metal oxide, a material that allows doping or undoping of lithium, and a material that allows reversible intercalation and deintercalation of lithium ions, which may be used as a mixture or in combination of at least two thereof.

The lithium metal alloy may be an alloy of lithium with a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanum (Ge), aluminum (Al), and tin (Sn).

Non-limiting examples of the transition metal oxide are tungsten oxide, molybdenum oxide, titanium oxide, lithium titanium oxide, vanadium oxide, and lithium vanadium oxide.

Examples of the material that allows doping or undoping of lithium therein are Si, Sn, Al, Ge, Pb, Bi, Sb, and a Si—Y alloy (where Y is an alkali metal, a alkali earth metal, a Group 11 element, a Group 12 element, a Group 13 element, a Group 14 element, a Group 15 element, a Group 16 element, a transition metal, a rare earth element, and a combination thereof, except for Sn. For example, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

The material that allows reversible intercalation and deintercalation of lithium ions may be any carbonaceous anode active material that is commonly used in a lithium battery. Examples of such carbonaceous materials are crystalline carbon, amorphous carbon, or mixtures thereof. Non-limiting examples of the crystalline carbon are natural graphite, artificial graphite, expanded graphite, graphene, fullerene soot, carbon nanotubes, and carbon fiber. Non-limiting examples of the amorphous carbon are soft carbon (carbon sintered at low temperatures), hard carbon, mesophase pitch carbides, and sintered corks. The carbonaceous anode active material may be in, for example, spherical, planar, fibrous, tubular, or powder form.

The binder strongly binds anode active material particles together and to the anode current collector. Non-limiting examples of the binder are polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, and nylon.

The conducting agent is used to provide conductivity to the anode. Any electron conducting material that does not induce chemical change in batteries may be used. Examples of the conducting agent are carbonaceous materials, such as natural graphite, artificial graphite, carbon black, acetylene black, ketjen black, carbon fibers, and the like; metal-based materials, such as copper (Cu), nickel (Ni), aluminum (Al), silver (Ag), and the like, in powder or fiber form; and conductive materials, including conductive polymers, such as a polyphenylene derivative, and mixtures thereof.

The amounts of the anode active material, the binder, and the conducting agent may be equivalent to those commonly used in lithium batteries. For example, a weight ratio of the anode active material to a mixture of the conducting agent and the binder may be from about 98:2 to about 92:8. A mixing ratio of the conducting agent to the binder may be, but not limited to, from about 1:1.5 to about 1:3.

The anode 112 and the cathode 114 may be each manufactured by mixing an active material, a conducting agent, and a binder in a solvent to prepare an active material composition, and coating the active material composition on a current collector. Any method of manufacturing such electrodes which is known to one of ordinary skill in the art may be used. Thus, a detailed description thereof will not be provided herein. Non-limiting examples of the solvent are N-methylpyrrolidone ("NMP"), acetone, and water.

A separator may be disposed between the cathode and the anode, according to the type of the lithium secondary battery. The separator may be any separator that is commonly used for lithium batteries. In particular, the separator may have low resistance to migration of ions in an electrolyte and have high electrolyte-retaining ability. Examples of the separator are glass fiber, polyester, Teflon, polyethylene, polypropylene, polyvinylidene fluoride ("PVDF"), polytetrafluoroethylene ("PTFE"), and a combination thereof, each of which may be a nonwoven fabric or a woven fabric. The separator may be a single layer or a multi-layer. Examples of the separator are a polyethylene/polypropylene double-layer separator, polyethylene/polypropylene/polyethylene triple-layer separator, and a polypropylene/polyethylene/polypropylene triple-layer separator. The separator may have a pore diameter of about 0.01 to about 10 μm and a thickness of about 3 to about 100 μm.

As described in the above embodiments, the electrolyte of the lithium secondary battery may include a lithium salt, a non-aqueous organic solvent, and a piperazine derivative of Formula 1 above with a polar substituent as an additive. The electrolyte may be injected between the cathode 114 and the anode 112 with the separator 113 therebetween.

One or more embodiments will now be described in detail with reference to the following examples. However, these examples are not intended to limit the scope of the one or more embodiments.

EXAMPLES

Example 1

0.1 wt % of 1-(2-aminoethyl)piperazine ("AEP") represented by Formula 3 below as an additive was added into a mixed organic solvent of 30 volume % of ethylene carbonate, 50 volume % of diethyl carbonate, and 20 volume % of ethylmethyl carbonate, and 1.3 M $LiPF_6$ as a lithium salt was added thereto, thereby preparing an electrolyte for a lithium secondary battery (Electrolyte A).

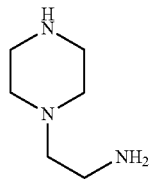

Formula 3

$Li_{1+x}(Ni,Co,Mn)_{1-x}O_2$ (wherein $0.05 \leq x \leq 0.25$) powder as a cathode active material, 5 percent by weight ("wt %") of polyvinylidene fluoride ("PVdF") binder dissolved in N-methylpyrrolidone ("NMP"), and a conducting agent (Denka black) were mixed in a weight ratio of 90:5:5 to prepare a cathode forming slurry. The cathode forming slurry was coated on an aluminum foil having a thickness of 15 μm. The aluminum foil coated with the cathode forming slurry was dried in a 90° C. oven for about 2 hours (first drying), and then in a 120° C. vacuum oven for about 2 hours (second drying) until the NMP was completely evaporated, followed by rolling and punching to obtain a cathode having a diameter of about 1.5 centimeters ("cm") and a thickness of about 50~60 μm for use in a coin cell. The cathode had a capacity of about 1.9 milliAmpere×hour per square centimeter ("mA×h/$cm^2$").

The cathode, a graphite anode (ICG10H, available from Mitsubishi), a polyethylene separator (Celgard 3501, available from Celgard), and the electrolyte A prepared as described above were used to manufacture a 2032 standard coin cell.

Example 2

A lithium secondary battery was manufactured in the same manner as in Example 1, except that 0.1 wt % of 1,4-bis(2-hydroxyethyl)piperazine ("BHEP") represented by Formula 4 below, instead of AEP of Formula 3 was used as the additive.

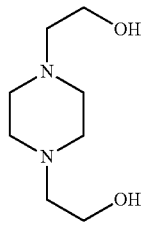 [SMILES: OCCN1CCN(CCO)CC1]

Formula 4

Example 3

A lithium secondary battery was manufactured in the same manner as in Example 1, except that 0.1 wt % of 1-(2-hydroxyphenyl)piperazine ("HPP") represented by Formula 5 below, instead of AEP of Formula 3, was used as the additive.

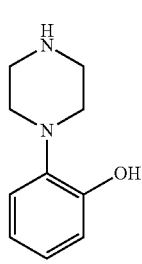

Formula 5

Example 4

A lithium secondary battery was manufactured in the same manner as in Example 1, except that 0.1 wt % of 3-piperazino propionitrile ("PCN") represented by Formula 6 below, instead of AEP of Formula 3, was used as the additive.

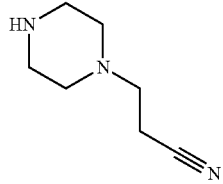

Formula 6

Comparative Example 1

A lithium secondary battery was manufactured in the same manner as in Example 1, except that a standard electrolyte ("STD") excluding AEP of Formula 3 was used.

Comparative Example 2

A lithium secondary battery was manufactured in the same manner as in Example 1, except that 0.1 wt % of piperazine ("PPR") represented by Formula 7 below, instead of AEP of Formula 3, was used as the additive.

Formula 7

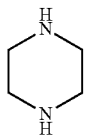

Comparative Example 3

A lithium secondary battery was manufactured in the same manner as in Example 1, except that 0.1 wt % of 1-(2-hydroxyethyl)piperazine ("HEP") represented by Formula 8 below, instead of AEP of Formula 3, was used as the additive.

Formula 8

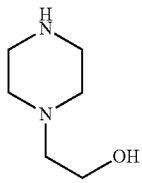

Comparative Example 4

A lithium secondary battery was manufactured in the same manner as in Example 1, except that 0.1 wt % of 1-(2-pyrimidyl)piperazine ("PMP") represented by Formula 9, instead of AEP of Formula 3, was used as the additive.

Formula 9

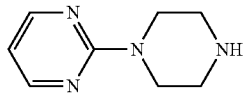

Evaluation Example 1

Measurement of Oxidation Potential of Additive

Oxidation potentials of AEP, BHEP, HPP, PCN, PPR, HEP, and PMP used as electrolyte additives in Examples 1-4 and Comparative Examples 2-4, respectively, were calculated using density functional theory (DFT; B3LYP/6-311+G(d,p))-based ab-initio calculation (Gaussian 03). The results are shown in Table 1 below. In calculating the oxidation potentials, oxidation reaction as illustrated below is was considered.

$$M(\text{solution}) \rightarrow M^+(\text{solution}) + e^-(\text{gas})$$

In this oxidation reaction, M and e indicate molecules and electrons of the additive, respectively.

A polarized continuum model ("PCM") was used in consideration of effects of neighboring electrolyte environment around additive molecules on the oxidation potential of the additive.

TABLE 1

| Example | Compound | Structure | $E_{ox}/E_{red}$ (V vs. Li) |
|---|---|---|---|
| Example 1 | 1-(2-aminoethyl)piperazine | | 3.58/−1.22 |
| Example 2 | 1,4-bis(2-hydroxyethyl)piperazine | | 3.49/−0.87 |
| Example 3 | 1-(2-hydroxyphenyl)piperazine | | 3.49/−0.49 |
| Example 4 | 3-piperazinopropionitrile | | 3.48/−0.01 |
| Comparative Example 2 | piperazine | | 3.56/−1.28 |
| Comparative Example 3 | 1-(2-hydroxyethyl)piperazine | | 3.39/−0.89 |
| Comparative Example 4 | 1-(2-pyrimidyl)piperazine | | 3.81/0.42 |
| Non-aqueous organic solvent | EMC | | 6.55 |
| Non-aqueous organic solvent | DEC | | 6.6 |

TABLE 1-continued

| Example | Compound | Structure | $E_{ox}/E_{red}$ (V vs. Li) |
|---|---|---|---|
| Non-aqueous organic solvent | EC | 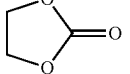 | 6.7 |

Referring to Table 1 above, the piperazine derivatives used in Examples 1-4 were found to have an oxidation potential lower by about 3 V or greater than a common carbonate-based non-aqueous organic solvent, which is known to have an oxidation potential of from about 6.5 V to about 6.7 V. This indicates that a lithium secondary battery using an electrolyte containing such a piperazine derivative as used in Examples 1-4 is likely to be decomposed earlier than the non-aqueous organic solvent of the electrolyte, and effectively forms a thin film on a surface of the cathode.

Evaluation Example 2

Evaluation of Lifetime Characteristics

Formation Charge and Discharge

Formation charging/discharging was performed twice on the lithium secondary batteries of Examples 1-4 and Comparative Examples 1-4 at room temperature.

In a first formation process constant-current charging was performed on each battery at 0.1 Coulomb ("C") to a voltage of 4.65 V, followed by constant-voltage charging to a 0.05 C current. Next, constant-current discharging was performed at 0.1 C to a voltage of 2.5 V. A second formation process was performed in the same manner as in the first formation process.

The term "1 C charging" refers to charging for 1 hour to reach the capacity of a battery in milliAmpere hour ("mA×h"). Likewise, the term "1 C discharging" refers to discharging for 1 hour to fully discharge the capacity of the battery in mA×h.

Standard Charge and Discharge

After the formation charging and discharging, each of the batteries obtained in Examples 1-4 and Comparative Examples 1-4 was charged at 0.5 C to a voltage of 4.55 V, and then discharged at 0.2 C to a voltage of 2.5 V. These charging and discharging conditions were termed as "standard charging and discharging conditions", and the discharge capacity in these conditions was defined as a "standard capacity". The measured standard capacities ranged from about 3.2 mA×h to about 3.5 mA×h.

Capacity Retention Rate (%)

Charging was performed on each of the lithium secondary batteries of Examples 1-4 and Comparative Examples 1-4 in a 25° C. constant-temperature chamber at 1 C to a voltage of 4.55 V, followed by discharging at 1 C to a voltage of 2.8 V. Then, a discharge capacity (discharge capacity after the 1st cycle) was measured. While the cycle of 1 C charging and 1 C discharging was repeated in the 25° C. chamber, a discharge capacity after each cycle was measured. The charging and discharging cycle was repeated 300 times in total. A capacity retention rate was calculated using the discharge capacity from each of the cycles. The cycle retention was calculated using Equation 1 below.

Capacity retention rate[%]=($n^{th}$ cycle discharge capacity/$1^{st}$ cycle discharge capacity)×100    Equation 1

Figure 3:
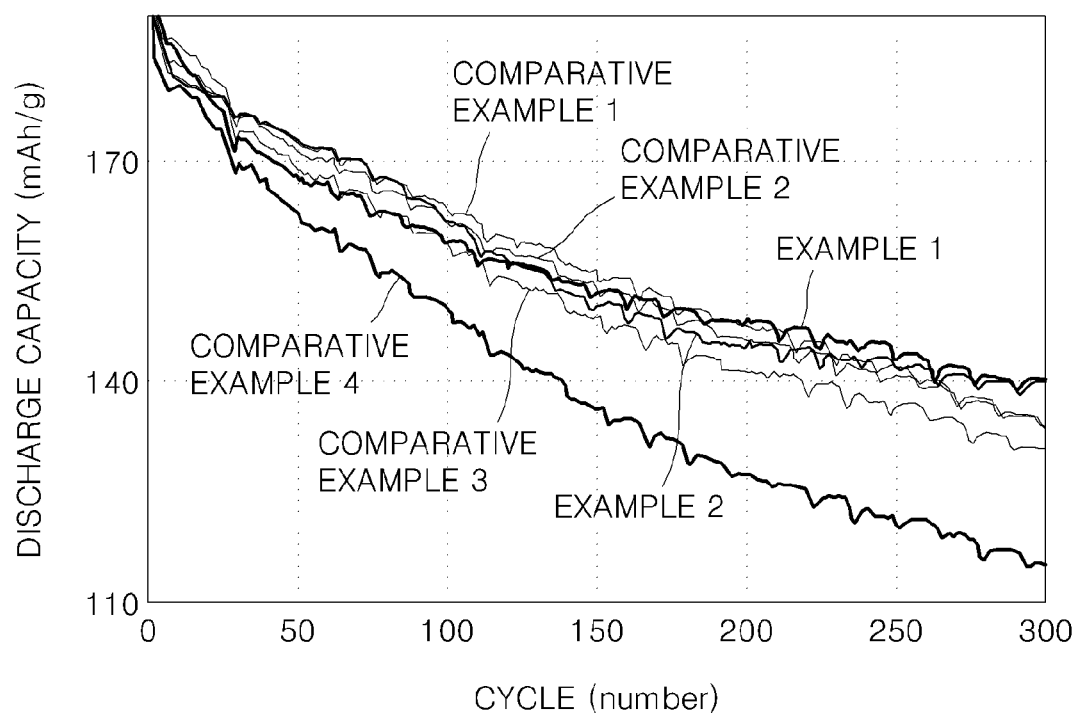
FIG. 3 is a graph of discharge capacity (milliAmpere× hour per gram, mA×h/g) versus cycle number showing discharge capacities of the lithium secondary batteries of Examples 1-2 and Comparative Examples 1-4.
Figure 4:
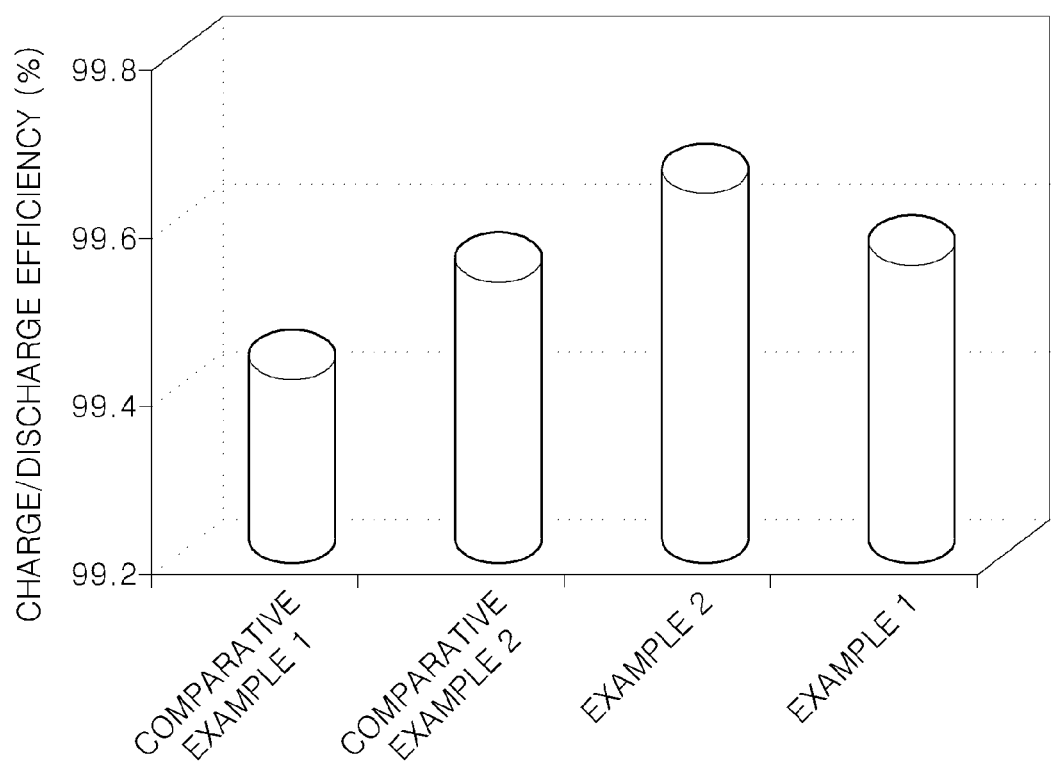
FIG. 4 is a diagram of charge/discharge efficiencies of the lithium secondary batteries of Examples 1-2 and Comparative Examples 1-2.

FIG. 3 is a graph of discharge capacities of the lithium secondary batteries of Examples 1 and 2, and Comparative Examples 1-4. FIG. 4 is a graph of average charge/discharge efficiencies of the lithium secondary batteries of Examples 1 and 2 and Comparative Examples 1 and 2 which were calculated based on over 300 cycles of charging and discharging.

Referring to FIGS. 3 and 4, the lithium secondary batteries of Examples 1 and 2 were found to have improved lifetime characteristics, as compared with those of Comparative Examples 1 to 4.

Evaluation Example 3

Evaluation of High-Rate Characteristics

High-rate discharge characteristics (rate capacities) of the lithium secondary batteries of Examples 1-4 and Comparative Examples 1-4 were evaluated after charging each cell at a constant current of 0.1 C and a constant voltage of 1.0 V (0.01 C cut-off), a rest for about 10 minutes, and then discharging the batteries at a constant current of 0.2 C, 0.33 C, 1 C, 2 C and 5 C, respectively, with a cut-off voltage of 2.5 V. The results are shown in FIG. 5.

Figure 5:
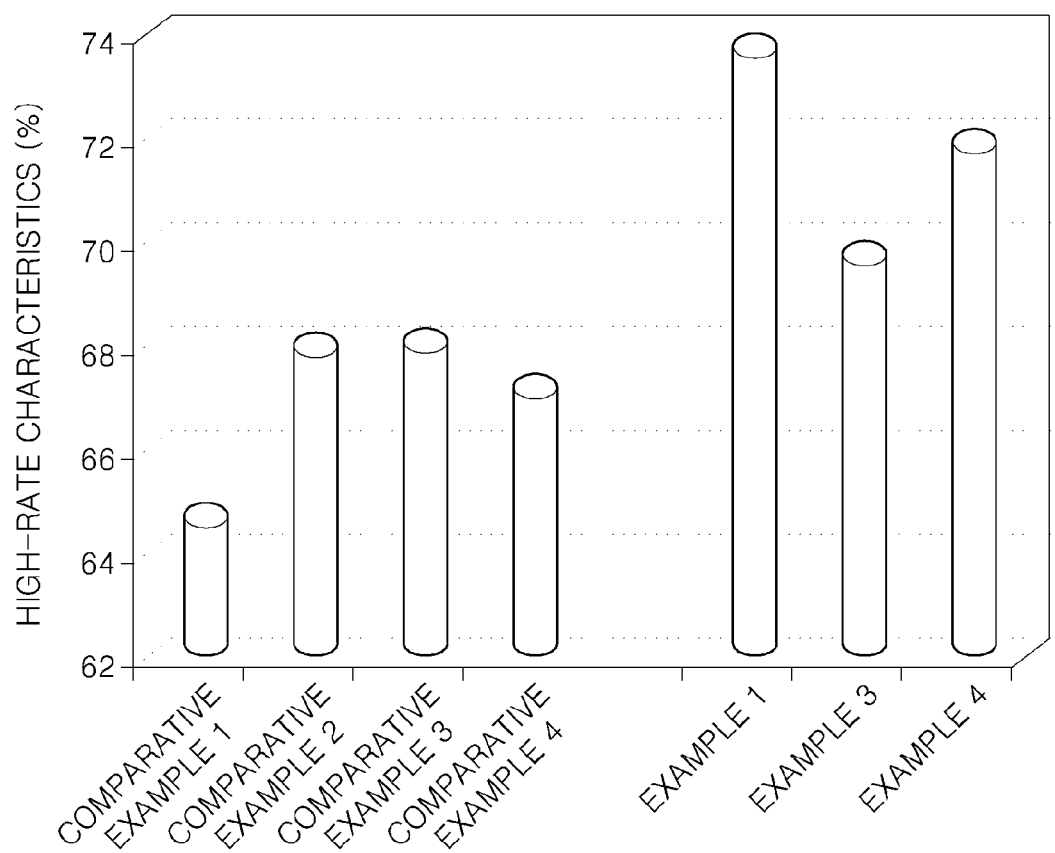
FIG. 5 is a graph of discharge capacity (milliAmpere× hour per gram, mA×h/g) versus cycle number showing high-rate characteristics of the lithium secondary batteries of Examples 1-4 and Comparative Examples 1-4.

Referring to FIG. 5, the lithium secondary batteries of Examples 1-4 were found to have better high-rate characteristics, as compared with the lithium secondary batteries of Comparative Examples 1-4.

After completion of the lifetime characteristics evaluation in Evaluation Example 1, the lithium secondary batteries of Examples 1 and 2 and Comparative Example 1 and 2 were each disassembled in a glove box to recover the cathode, which was then cleaned with dimethyl carbonate to remove the electrolyte and the lithium salt therefrom, and dried. A surface material was taken from the cathode as a sample, which was then analyzed using an X-ray photoelectron spectroscope ("XPS") (Sigma Probe, Thermo, UK). The results are shown in FIGS. 6A to 6C.

Figure 6A:
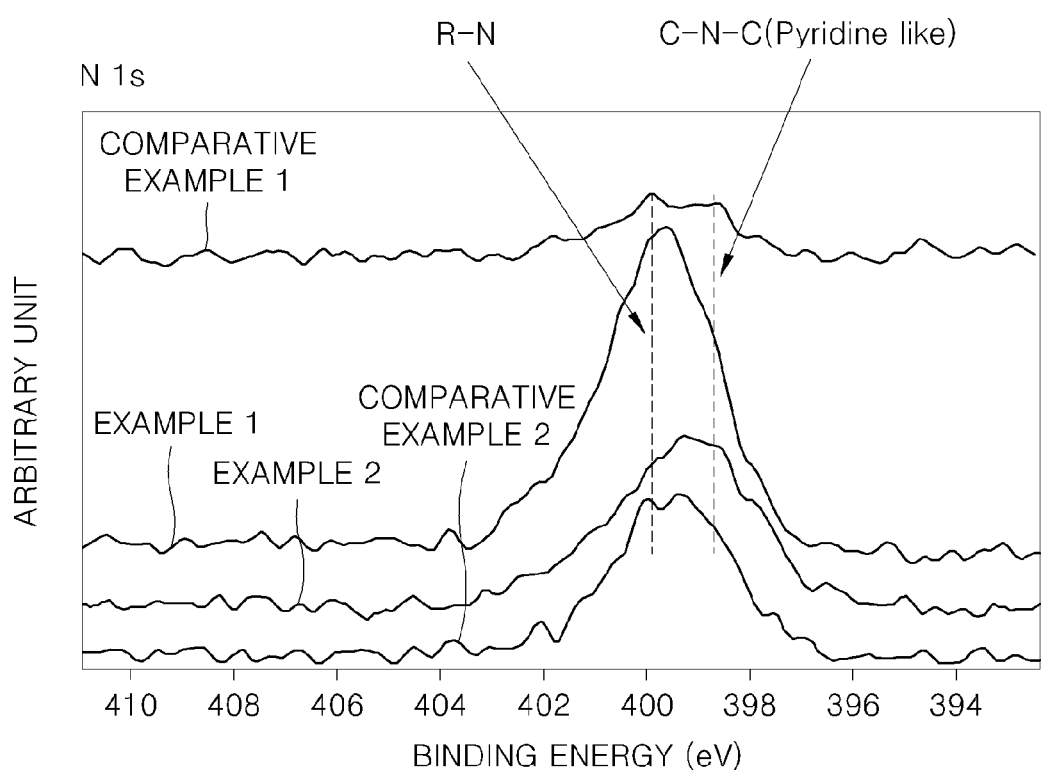
FIGS. 6A to 6C are graphs of intensity (arbitrary units, a. u.) versus binding energy (electron Volt, eV) illustrating X-ray photoelectron spectra of cathode surface material from the lithium secondary batteries of Examples 1-2 and Comparative Examples 1 and 2 after $300^{th}$ charge and discharge cycle.
Figure 6B:
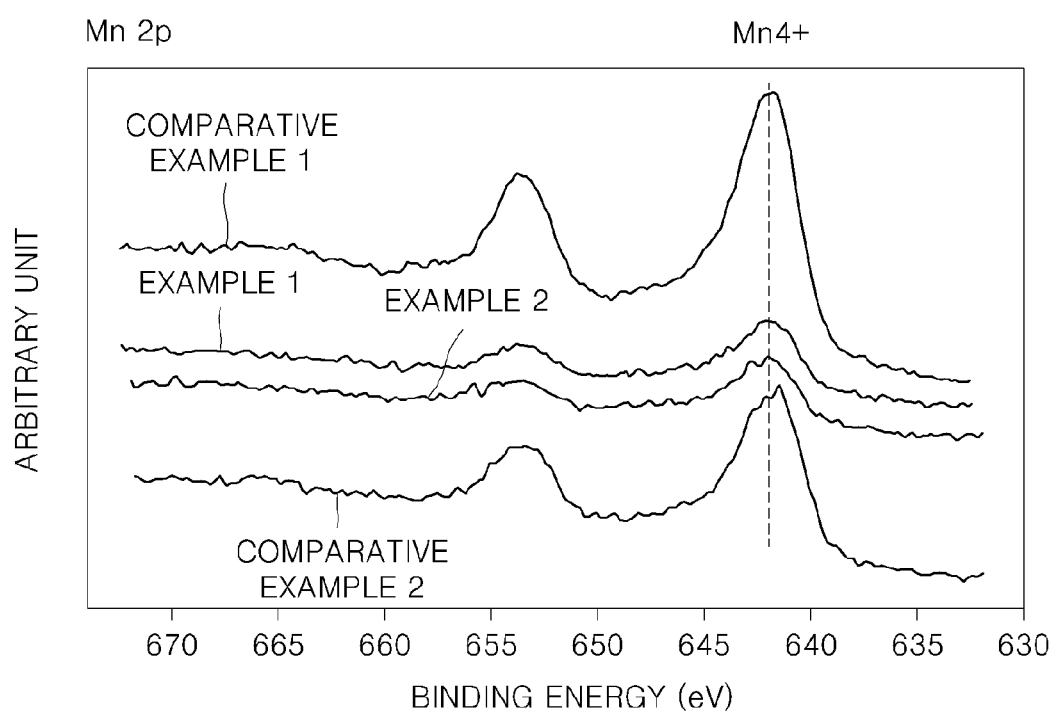
Figure 6C:
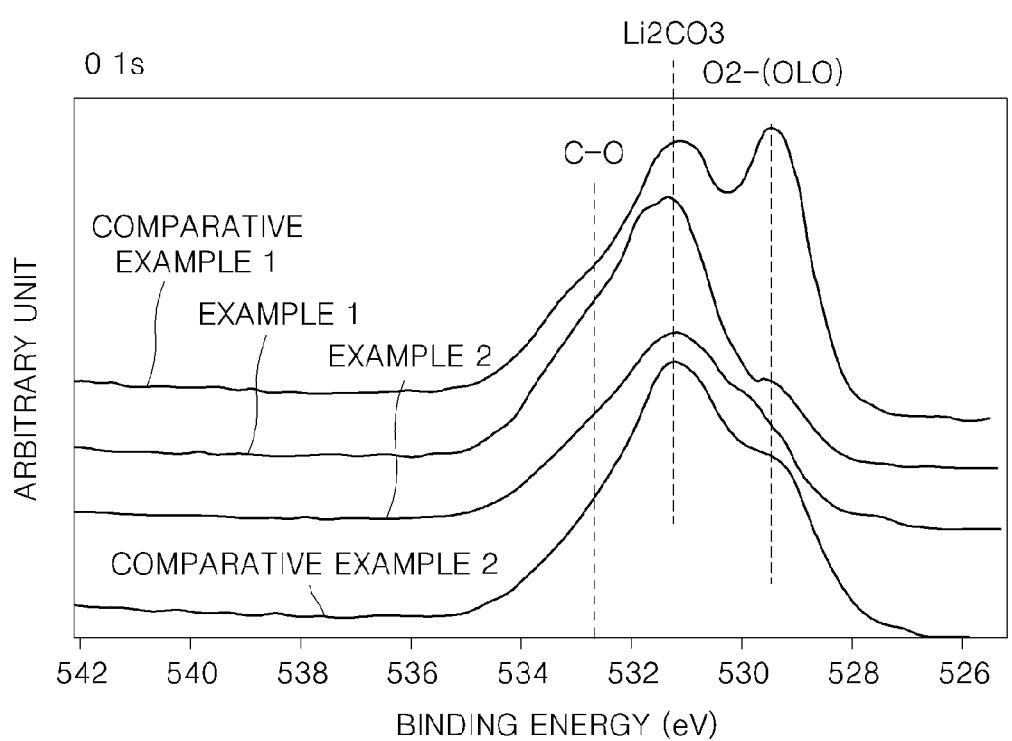

FIGS. 6A to 6C are X-ray photoelectron spectra illustrating the N 1 s peak, Mn 2 p peak, and O 1 s peak, respectively, of the surface material sampled from the surface of the cathode of each of the lithium secondary batteries of Examples 1 and 2 and Comparative Examples 1 and 2.

Referring to FIGS. 6A to 6C, the surface materials sampled from the surface of the cathode of the lithium secondary batteries of Examples 1 and 2 were found to have larger N 1 s peaks in comparison to those of Comparative Examples 1 and 2, indicating that a thin film was formed from the piperazine derivative used as an additive in each of Examples 1 and 2, while the surface materials sampled from the surface of the cathode of the lithium secondary batteries of Examples 1 and 2 were found to have smaller Mn 2 p and O 1 s (layered oxide) peaks in comparison to those of Comparative Examples 1 and 2, indicating the thin films resulting from the additives may have improved passivation effects even after the $300^{th}$ charge/discharge cycle.

Based on the results of FIGS. 6A to 6C, the lithium secondary battery of Example 1 was found to have a thin film derived from Electrolyte A on the surface of the cathode, wherein the thin film remains, not decomposed, even after operation at high temperatures.

According to the one or more embodiments of the present disclosure, a thin film may be formed on a surface of the cathode active material of the battery during initial charging and discharging, from an additive in the electrolyte, and thus prevents direct contact of the electrolyte with the cathode active material. The thin film allows only lithium ions to pass through, but not electrons, so that oxidation of the electrolyte from losing electrons to the cathode in a high-temperature, high-voltage condition may be prevented. The additive may be decomposed under high-temperature, high-voltage conditions to form the thin film, which prevents decomposition of the electrolyte. The prevention of the electrolyte loss under high-temperature and high-voltage conditions may secure the lithium secondary battery to retain high capacity and efficiency, and thus to have longer lifetime.

The improvements in lifetime characteristics and high-temperature storage characteristics enable the lithium secondary batteries according to the above-described embodiments to normally operate in an extreme environment when used in electric vehicles or in power storages that are exposed to high-temperatures. According to the embodiments, the electrolyte is also expected to be used in a lithium secondary battery using a cathode active material to which a far high voltage is applied, for example, a 5 V spinel, or a high-voltage phosphate cathode active material, taking an important part in improving the energy density of batteries for electric vehicles and power storages.

As described above, according to the one or more of the above embodiments, an electrolyte for a lithium secondary battery including a piperazine derivative of Formula 1 above may form a thin film on a cathode surface of the lithium secondary battery, and thus may improve lithium ion conductivity and stability when the lithium secondary battery is operated at a high-voltage. A lithium secondary battery including the electrolyte may have improved lifetime characteristics and improved high-rate characteristics due to suppressed oxidation and decomposition of the electrolyte.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:
1. A lithium secondary battery comprising:
a cathode comprising a cathode active material,
an anode comprising an anode active material, and
a non-aqueous liquid electrolyte comprising:
a lithium salt;
a non-aqueous organic solvent;
a piperazine derivative additive represented by Formula 1 having an oxidation potential lower than an oxidation potential of the non-aqueous organic solvent by about 2 V to about 4 V:

Formula 1

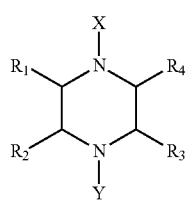

wherein, in Formula 1,
at least one of X and Y is selected from a $C_1$-$C_{60}$ aminoalkyl group, a $C_1$-$C_{60}$ thioalkyl group, a $C_1$-$C_{60}$ hydroxyalkyl group, a $C_1$-$C_{60}$ alkylnitrile group, and a substituted $C_6$-$C_{60}$ aryl group, and the unselected rest of X and Y is a hydrogen atom;
$R_1$ to $R_4$ are each independently selected from a hydrogen atom, a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, —C(=O)—H, a substituted or unsubstituted $C_1$-$C_{60}$ alkyl group, a substituted or unsubstituted $C_1$-$C_{60}$ alkoxy group, a substituted or unsubstituted $C_1$-$C_{60}$ heteroalkyl group, a substituted or unsubstituted $C_2$-$C_{60}$ alkenyl group, a substituted or unsubstituted $C_2$-$C_{60}$ alkynyl group, a substituted or unsubstituted $C_3$-$C_{10}$ cycloalkyl group, a substituted or unsubstituted $C_3$-$C_{10}$ heterocycloalkyl group, a substituted or unsubstituted $C_2$-$C_{10}$ cycloalkenyl group, a substituted or unsubstituted $C_2$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_2$-$C_{60}$ heteroaryl group, -$(Q_1)_r$-$(Q_2)_s$, —N$(Q_3)(Q_4)(Q_5)$, —P(=O)$(Q_6)(Q_7)$, and —P$(Q_8)(Q_9)(Q_{10})(Q_{11})$;
wherein at least one of $R_{11}$ to $R_{14}$ and at least one of $R_{21}$ to $R_{30}$ are optionally linked to each other to form a substituted or unsubstituted, saturated or unsaturated ring;
$Q_1$ is at least one selected from —O—, —S—, —C(=O)—, a substituted or unsubstituted $C_1$-$C_{60}$ alkylene group, a substituted or unsubstituted $C_2$-$C_{60}$ alkenylene group, a substituted or unsubstituted $C_3$-$C_{10}$ cycloalkylene group, a substituted or unsubstituted $C_3$-$C_{10}$ heterocycloalkylene group, a substituted or unsubstituted $C_2$-$C_{10}$ cycloalkenylene group, a substituted or unsubstituted $C_2$-$C_{10}$ heterocycloalkenylene group, a substituted or unsubstituted $C_6$-$C_{60}$ arylene group, and a substituted or unsubstituted $C_2$-$C_{60}$ heteroarylene group;
$Q_2$ to $Q_{11}$ are each independently selected from a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, a substituted or unsubstituted $C_1$-$C_{60}$ alkyl group, a substituted or unsubstituted $C_1$-$C_{60}$ alkoxy group, a substituted or unsubstituted $C_1$-$C_{60}$ heteroalkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_3$-$C_{10}$ heterocycloalkyl group, a substituted or unsubstituted $C_2$-$C_{10}$ cycloalkenyl group, a substituted or unsubstituted $C_2$-$C_{10}$ heterocycloalkenyl group, a substituted or unsubstituted $C_6$-$C_{60}$ aryl group, a substituted or unsubstituted $C_6$-$C_{60}$ aryloxy group, and a substituted or unsubstituted $C_2$-$C_{60}$ heteroaryl group; and
r and s are each independently an integer from 1 to 5, wherein, when r is 2 or greater, groups $Q_1$ are each identical to or different from each other, and when s is 2 or greater, groups $Q_2$ are each identical to or different from each other, wherein the lithium secondary battery further comprises a film disposed between the cathode and the electrolyte, wherein the film comprises at least a part of the additive.

2. The lithium secondary battery of claim 1, wherein $R_1$ to $R_4$ in Formula 1 are each independently selected from a hydrogen atom, a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, —C(=O)—H, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and $-(Q_1)_r-(Q_2)_s$, wherein $Q_1$ is selected from —O—, —S—, —C(=O)—, a $C_1$-$C_{10}$ alkylene group, a $C_6$-$C_{14}$ arylene group, and a $C_2$-$C_{14}$ heteroarylene group;

$Q_2$ is selected from a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, —C(=O)—H, a methyl group, an ethyl group, an n-propyl group, an isopropyl group, an n-butyl group, an isobutyl group, a sec-a butyl group, a tert-butyl group, a n-pentyl group, an isopentyl group, a sec-pentyl group, a tert-pentyl group, a n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and a $C_1$-$C_{10}$ alkoxy group, and r and s are each independently an integer from 1 to 5 wherein, when r is 2 or greater, groups $Q_1$ are each identical to or different from each other, and when s is 2 or greater, groups $Q_2$ are each identical to or different from each other.

3. The lithium secondary battery of claim 1, wherein $R_1$ to $R_4$ in Formula 1 are each independently selected from a hydrogen atom, a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, —C(=O)—H, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and groups represented by Formulae 3A and 3B:

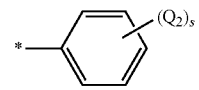

Formula 3A

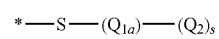

Formula 3B wherein, in Formulae 3A and 3B, $Q_1a$ is a $C_1$-$C_{10}$ alkylene group;

$Q_2$ is selected from a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, —C(=O)—H, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and a $C_1$-$C_{10}$ alkoxy group; and s is an integer of 1, 2, or 3.

4. The lithium secondary battery of claim 1, wherein the piperazine derivative comprises a compound represented by Formula 2:

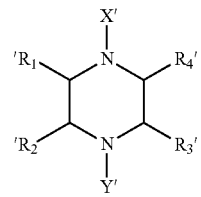

Formula 2 wherein, in Formula 2, at least one of X' and Y' is a substituent selected from a $C_1$-$C_{10}$ hydroxyalkyl group, a $C_1$-$C_{10}$ aminoalkyl group, a $C_1$-$C_{10}$ alkylnitrile group, and a substituted $C_6$-$C_{10}$ aryl group, and the unselected rest of X' and Y' is a hydrogen atom;

$R_1$ to $R_4$ is each independently selected from a hydrogen atom, a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, —C(=O)—H, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and $-(Q_1)_r-(Q_2)_s$, wherein $Q_1$ is selected from —O—, —S—, —C(=O)—, a $C_1$-$C_{10}$ alkylene group, a $C_6$-$C_{14}$ arylene group, and a $C_2$-$C_{14}$ heteroarylene group;

$Q_2$ is selected from a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, —C(=O)—H, a methyl group, an ethyl group, an n-propyl group, an isopropyl group, an n-butyl group, an isobutyl group, a sec-a butyl group, a tert-butyl group, a n-pentyl group, an isopentyl group, a sec-pentyl group, a tert-pentyl group, a n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and a $C_1$-$C_{10}$ alkoxy group, and r and s are each independently an integer from 1 to 5 wherein, when r is 2 or greater, groups $Q_1$ are each identical to or different from each other, and when s is 2 or greater, groups $Q_2$ are each identical to or different from each other.

5. The lithium secondary battery of claim 1, wherein the piperazine derivative of Formula 1 comprises at least one of compounds represented by Formulae 3 to 6

Formula 3

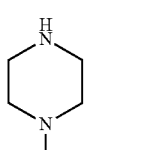

Formula 4

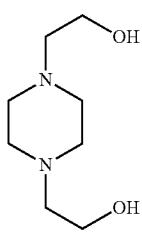

Formula 5

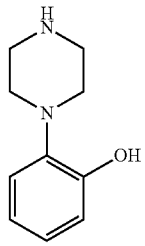

Formula 6

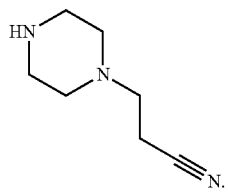

6. The lithium secondary battery of claim 1, wherein the piperazine derivative is disposed on a surface of a cathode at an operating voltage of from about 4.0 V to about 5.5 V.

7. The lithium secondary battery of claim 1, wherein the lithium salt comprises $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiBPh_4$, $LiN(C_xF_{2x+1}SO_2)(C_xF_{2y+1}SO_2)$, wherein x and y are natural numbers, LiCl, LiI, lithium bisoxalato borate, or a combination thereof.

8. The lithium secondary battery of claim 1, wherein an amount of the piperazine derivative additive is from about 0.005 percent by weight to about 1 percent by weight based on a total weight of the non-aqueous liquid electrolyte.

9. The lithium secondary battery of claim 1, wherein the cathode active material comprises at least one of $LiCoO_2$, $LiNi_{1-x}Co_xO_2$ (wherein 0≤x<1), $Li_{1-x}M_xO_2$ (wherein M comprises at least one of Mn and Fe, and 0.03<x<0.1), $Li[Ni_xCo_{1-2x}Mn_x]O_2$ (wherein 0<x<0.5), $Li[Ni_xMn_x]O_2$ (wherein 0<x≤0.5), $Li_{1+x}(Ni,Co,Mn)_{1-y}O_z$(wherein 0<x≤1, 0≤y<1 and 2≤z≤4), $LiM_2O_4$ (wherein M comprises at least one of Ti, V, and Mn), $LiM_xMn_{2-x}O_4$ (wherein M is a transition metal), $LiFePO_4$, $LiMPO_4$ (wherein M comprises at least one of Mn, Co, and Ni), $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $δ-Mn_yV_2O_5$, $δ-NH_4V_4O_{10}$, $Mn_{0.8}V_7O_{16}$, $LiV_3O_8$, $Cu_xV_2O_5$, $Cr_xV_6O_{13}$, $M_2(XO_4)_3$ (wherein M is a transition metal; and X comprises at least one of S, P, As, Mo, and W), and $Li_3M_2(PO_4)_3$ (wherein M comprises at least one of Fe, V, and Ti).

10. The lithium secondary battery of claim 1, wherein the cathode active material comprises $Li_{1+x}M_{1-x}O_2$ (wherein M comprises at least one of Ni, Co, and Mn, and 0.05≤x≤0.2), or $LiNi_{0.5}Mn_{1.5}O_4$.

11. The lithium secondary battery of claim 1, wherein the anode active material comprises at least one of lithium metal, a lithium metal alloy, a transition metal oxide, a material that allows doping or undoping of lithium, and a material that allows reversible intercalation and deintercalation of lithium ions.

12. The lithium secondary battery of claim 1, further comprising a separator disposed between the cathode and the anode.

13. The lithium secondary battery of claim 1, wherein an amount of the piperazine derivative additive is from about 0.01 percent by weight to about 1 percent by weight based on a total weight of the non-aqueous liquid electrolyte.

14. A non-aqueous liquid electrolyte for a lithium secondary battery, the non-aqueous liquid electrolyte comprising:
a lithium salt;
a non-aqueous organic solvent; and
a piperazine derivative additive represented by Formula 1 having an oxidation potential lower than an oxidation potential of the non-aqueous organic solvent by about 2 V to about 4 V:

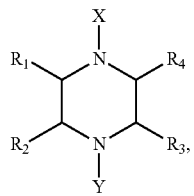

Formula 1 wherein, in Formula 1,
at least one of X and Y is selected from a $C_1$-$C_{60}$ thioalkyl group, a $C_1$-$C_{60}$ hydroxyalkyl group, a $C_1$-$C_{60}$ alkylnitrile group, and a substituted $C_6$-$C_{60}$ aryl group, and the unselected rest of X and Y is a hydrogen atom;
$R_1$ to $R_4$ are each independently selected from a hydrogen atom, a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, —C(=O)—H, a substituted or unsubstituted $C_1$-$C_{60}$ alkyl group, a substituted or unsubstituted $C_1$-$C_{60}$ alkoxy group, a substituted or unsubstituted $C_1$-$C_{60}$ heteroalkyl group, a substituted or unsubstituted $C_2$-$C_{60}$ alkenyl group, a substituted or unsubstituted $C_2$-$C_{60}$ alkenyl group, a substituted or unsubstituted $C_3$-$C_{10}$ cycloalkyl group, a substituted or unsubstituted $C_3$-$C_{10}$ heterocycloalkyl group, a substituted or unsubstituted $C_2$-$C_{10}$ cycloalkenyl group, a substituted or unsubstituted $C_2$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_2$-$C_{60}$ heteroaryl group, -$(Q_1)_r$-$(Q_2)_s$, —N$(Q_3)(Q_4)(Q_5)$, —P(=O)$(Q_6)(Q_7)$, and —P$(Q_8)(Q_9)(Q_{10})(Q_{11})$;
wherein at least one of $R_{11}$ to $R_{14}$ and at least one of $R_{21}$ to $R_{30}$ are optionally linked to each other to form a substituted or unsubstituted, saturated or unsaturated ring;
$Q_1$ is at least one selected from —O—, —S—, —C(=O)—, a substituted or unsubstituted $C_1$-$C_{60}$ alkylene group, a substituted or unsubstituted $C_2$-$C_{60}$ alkenylene group, a substituted or unsubstituted $C_3$-$C_{10}$ cycloalkylene group, a substituted or unsubstituted $C_3$-$C_{10}$ heterocycloalkylene group, a substituted or unsubstituted $C_2$-$C_{10}$ cycloalkenylene group, a substituted or unsubstituted $C_2$-$C_{10}$ heterocycloalkenylene group, a substituted or unsubstituted $C_6$-$C_{60}$ arylene group, and a substituted or unsubstituted $C_2$-$C_{60}$ heteroarylene group;
$Q_2$ to $Q_{11}$ are each independently selected from a deuterium atom, a halogen atom, a hydroxyl group, a cyano group, a nitro group, an azido group, an amino group, an amido group, an amidino group, a hydrazine group, a hydrazone group, a carboxyl group or a salt thereof, a sulfonic acid group or a salt thereof, a phosphoric acid group or a salt thereof, a thiol group, a substituted or unsubstituted $C_1$-$C_{60}$ alkyl group, a substituted or unsubstituted $C_1$-$C_{60}$ alkoxy group, a substituted or unsubstituted $C_1$-$C_{60}$ heteroalkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_3$-$C_{10}$ heterocycloalkyl group, a substituted or unsubstituted $C_2$-$C_{10}$ cycloalkenyl group, a substituted or unsubstituted $C_2$-$C_{10}$ heterocycloalkenyl group, a substituted or unsubstituted $C_6$-$C_{60}$ aryl group, a substituted or unsubstituted $C_6$-$C_{60}$ aryloxy group, and a substituted or unsubstituted $C_2$-$C_{60}$ heteroaryl group; and
r and s are each independently an integer from 1 to 5, wherein,
when r is 2 or greater, groups $Q_1$ are each identical to or different from each other, and
when s is 2 or greater, groups $Q_2$ are each identical to or different from each other.

* * * * *